(12) United States Patent
Maeda et al.

(10) Patent No.: US 9,199,665 B2
(45) Date of Patent: Dec. 1, 2015

(54) ELECTRIC POWER STEERING SYSTEM

(71) Applicant: JTEKT CORPORATION, Osaka-shi, Osaka (JP)

(72) Inventors: Shingo Maeda, Okazaki (JP); Terutaka Tamaizumi, Okazaki (JP); Hidenori Itamoto, Taijimi (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/271,768

(22) Filed: May 7, 2014

(65) Prior Publication Data

US 2014/0343789 A1    Nov. 20, 2014

(30) Foreign Application Priority Data

| May 15, 2013 | (JP) | 2013-103241 |
| Jul. 29, 2013 | (JP) | 2013-156859 |
| Feb. 3, 2014 | (JP) | 2014-018646 |

(51) Int. Cl.
  *B62D 5/04*  (2006.01)

(52) U.S. Cl.
  CPC .......... *B62D 5/0463* (2013.01); *B62D 5/0457* (2013.01); *B62D 5/0493* (2013.01)

(58) Field of Classification Search
  CPC combination set(s) only.
  See application file for complete search history.

(56) References Cited

U.S. PATENT DOCUMENTS

| 7,009,358 B2 * | 3/2006 | Tamaizumi et al. | 318/632 |
| 2008/0097669 A1 * | 4/2008 | Kasbarian et al. | 701/42 |
| 2009/0084616 A1 * | 4/2009 | Kezobo et al. | 180/6.44 |
| 2009/0234538 A1 * | 9/2009 | Ta et al. | 701/41 |
| 2011/0010054 A1 * | 1/2011 | Wilson-Jones et al. | 701/42 |
| 2011/0054742 A1 * | 3/2011 | Yamashita | 701/43 |
| 2011/0315469 A1 * | 12/2011 | Uryu | 180/443 |

FOREIGN PATENT DOCUMENTS

JP   A-2010-155598    7/2010

OTHER PUBLICATIONS

Jun. 5, 2015 Search Report issued in European Patent Application No. 14168079.3.

* cited by examiner

*Primary Examiner* — Thomas Tarcza
*Assistant Examiner* — Edward Pipala
(74) *Attorney, Agent, or Firm* — Oliff PLC

(57) ABSTRACT

There is provided an electric power steering system that is able to generate a more appropriate current command value. Limits of an assist controlled variable, formed of multiple upper limits and multiple lower limits are individually set for multiple signals used to compute the assist controlled variable. The values obtained by adding the limits together are set as final limits of the assist controlled variable, that is, an upper limit and a lower limit. Thus, even if the assist controlled variable exhibiting an abnormal value is computed for some reason, the abnormal value of the assist controlled variable is limited to an appropriate value corresponding to each signal value by the final limits. By supplying the appropriate assist controlled variable to a motor control signal generating unit as a final current command value, an appropriate assist force is applied to a steering system.

13 Claims, 32 Drawing Sheets

F I G . 9
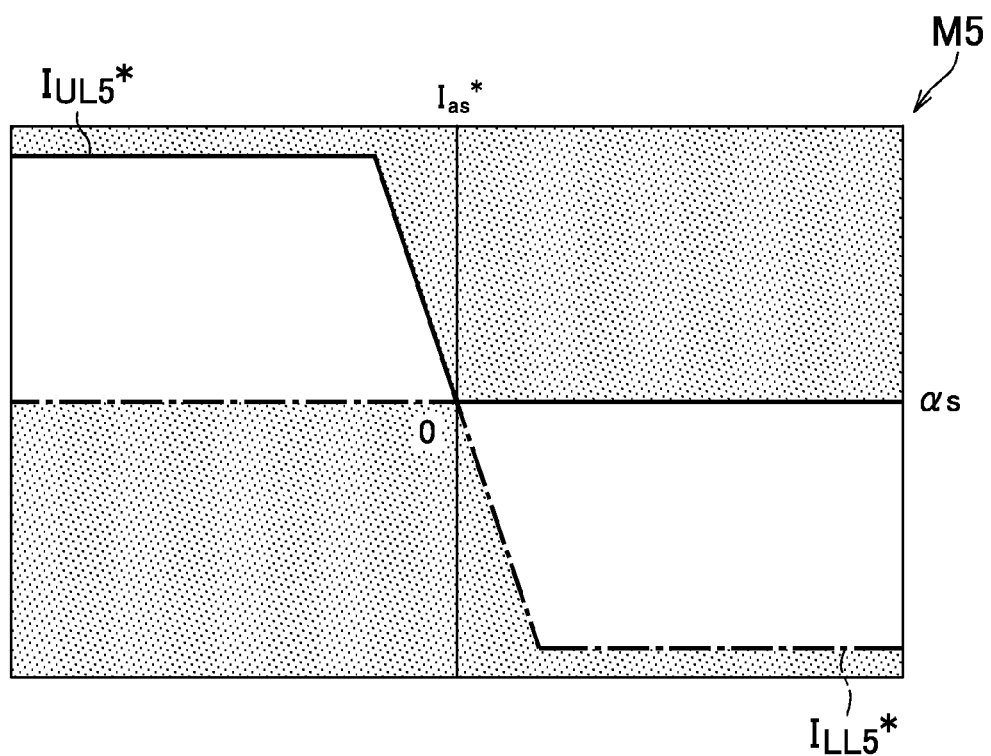

F I G . 17
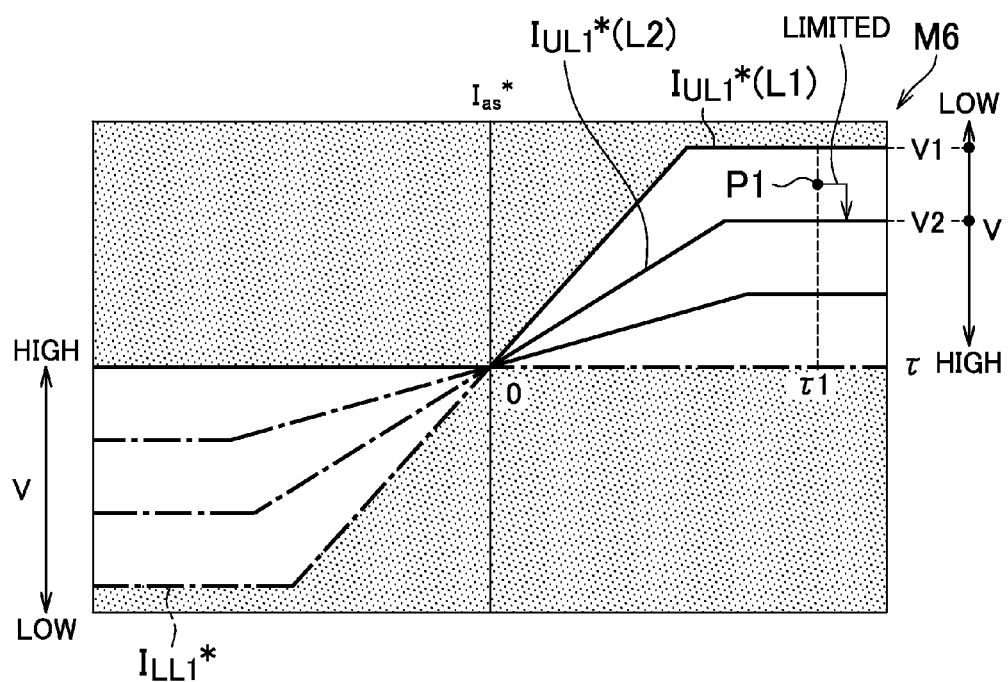

F I G . 19
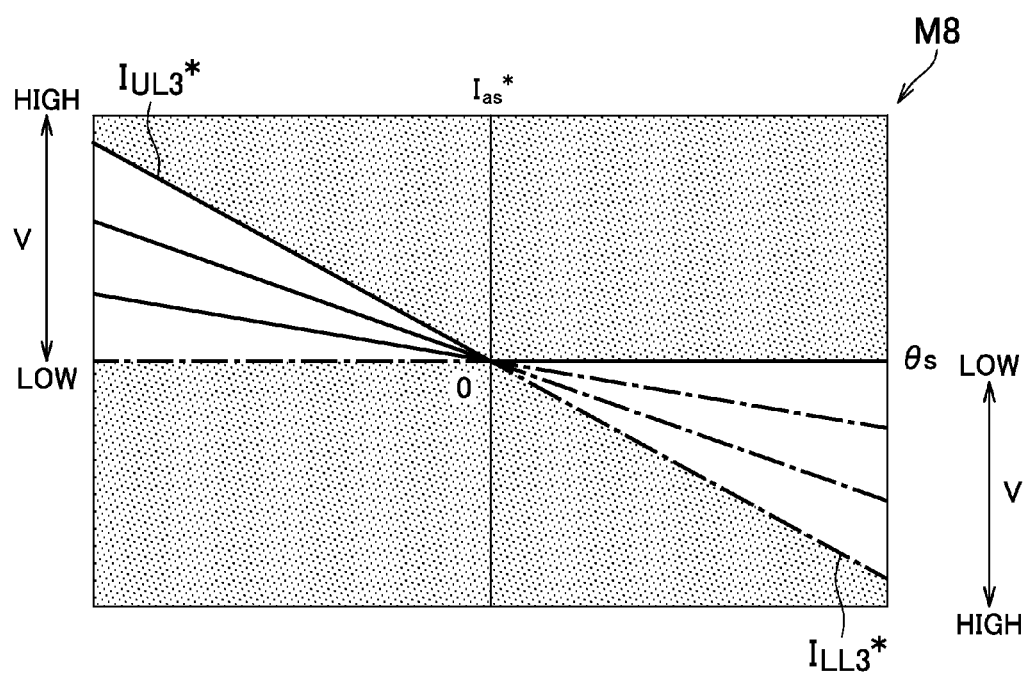

F I G . 20
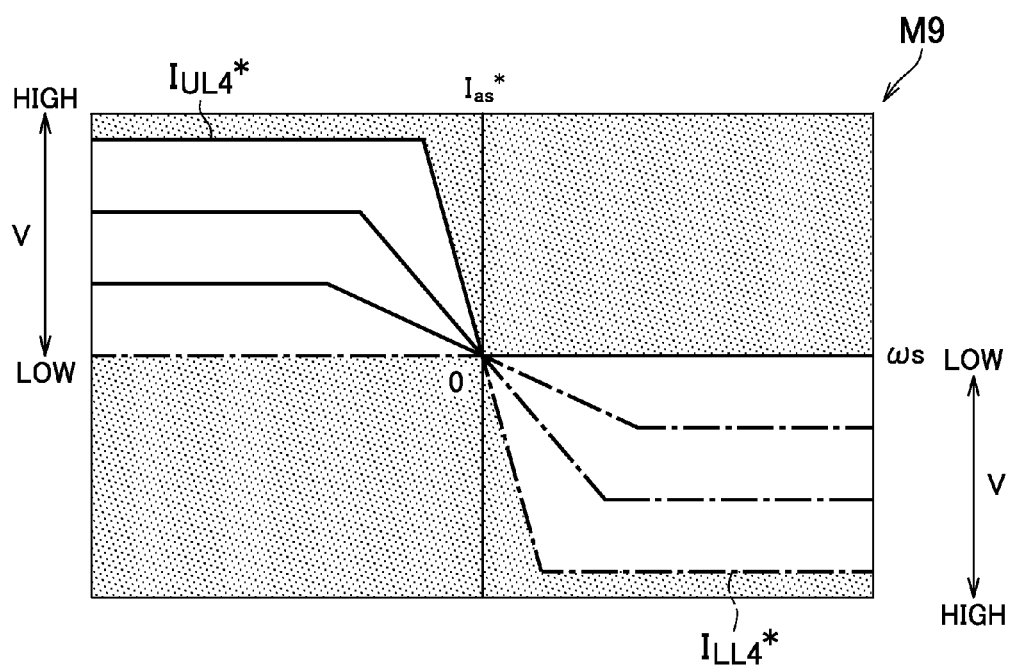

F I G . 24
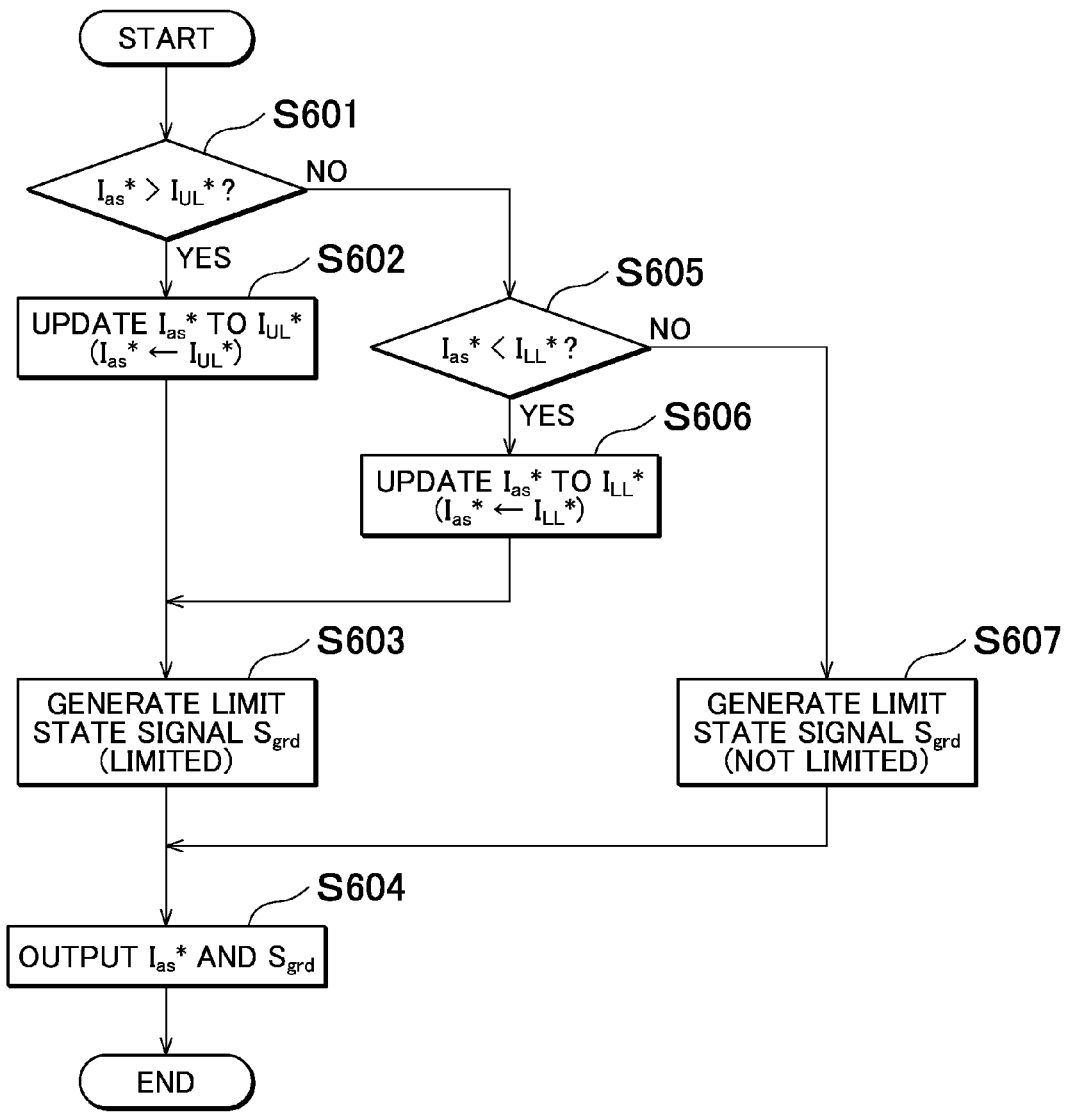

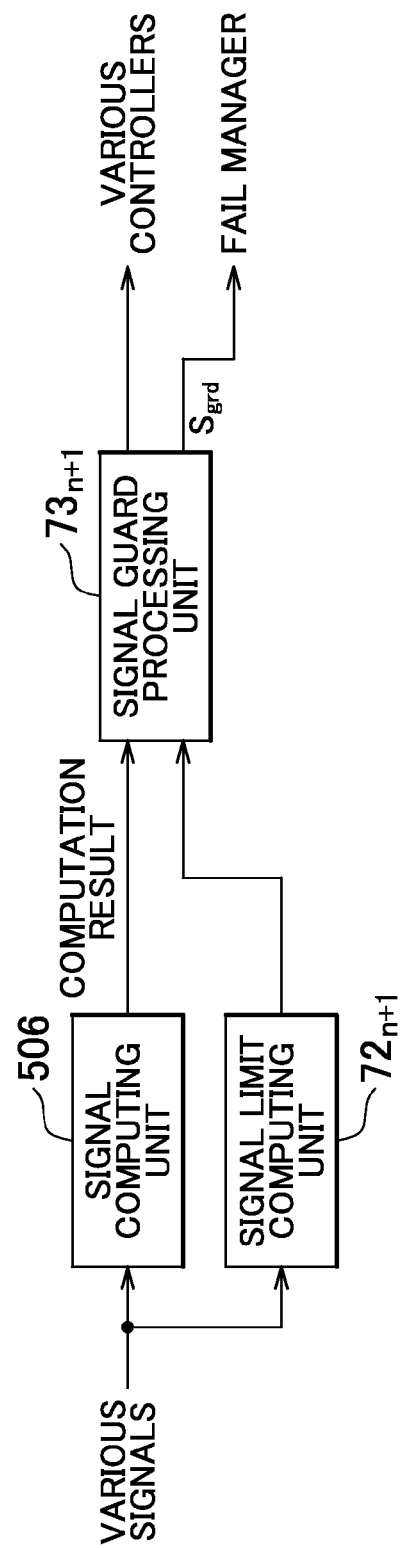

ELECTRIC POWER STEERING SYSTEM

INCORPORATION BY REFERENCE

The disclosure of Japanese Patent Application No. 2013-103241 filed on May 15, 2013, No. 2013-156859 filed on Jul. 29, 2013, and No. 2014-018646 filed on Feb. 3, 2014 including the specification, drawings and abstract, is incorporated herein by reference in its entirety.

BACKGROUND OF THE INVENTION

1. Field of the Invention

The invention relates to an electric power steering system.

2. Description of the Related Art

As described in, for example, Japanese Patent Application Publication No. 2010-155598 (JP 2010-155598 A), an electric power steering system (hereinafter, referred to as "EPS") assists a driver's steering operation by applying torque generated by a motor to a steering mechanism of a vehicle. The EPS executes feedback control of motor currents to generate an appropriate assist force based on at least a steering torque. That is, the EPS adjusts the voltage to be applied to the motor by adjusting the duty ratio through pulse width modulation (PWM) such that the difference between an assist current command value, computed on the basis of at least the steering torque, and a detected motor current value is decreased.

Because the EPS is required to ensure a higher level of safety, the EPS described in JP 2010-155598 A employs the following configuration. That is, the EPS limits the assist current command value to a value within a range between prescribed upper and lower limits, inclusive, when the sign (positive sign or negative sign) of the steering torque and the sign (positive sign or negative sign) of the assist current command value coincide with each other. On the other hand, when the steering torque and the assist current command value are opposite in sign to each other, the EPS determines that an abnormality has occurred in the assist control computation and limits the assist current command value to zero.

However, the EPS described in JP 2010-155598 A leaves room for improvement in the following respect. That is, the EPS described in JP 2010-155598 A is not able to limit the assist current command value to zero when the steering torque is within a range of small values (a range centered at zero and between prescribed positive and negative values, inclusive). Generally, the assist current command value is generated by adding a compensation amount for adjusting the steering behavior to a basic component based on the steering torque. However, the sign of the compensation amount does not coincide with the sign of the steering torque in some cases. When the steering torque is large, even if the sign of the compensation amount does not coincide with the sign of the steering torque, the compensation amount is cancelled out by the basic component and thus the sign of the assist current command value itself coincides with the sign of the steering torque. Therefore, the non coincidence between the sign of the assist current command value and the sign of the steering torque may be regarded as occurrence of an abnormality of the assist control computation. However, when the steering torque is within the range of small values, the basic component is small and the ratio of the compensation amount to the assist current command value is high. Therefore, even if there is no abnormality in the assist control computation, there is a possibility that the sign of the assist current command value and the sign of the steering torque will not coincide with each other. In this case, if the assist current command value is limited to zero, there is a possibility that the steering behavior will not be adjusted.

Therefore, when the steering torque is within the range of small values, the EPS described in JP 2010-155598 A does not limit the assist current command value to zero, but limits the assist current command value within a range having a margin where the compensation amount is not limited. Therefore, even if an abnormal assist current command value is erroneously computed for some reason, the assist current command value is not strictly limited when the steering torque is within the range of small values. Thus, an unintended assist force may be applied to the steering mechanism and self-steer may occur in some cases.

SUMMARY OF THE INVENTION

The invention is made in order to reduce the occurrence of the above-described phenomenon, and one object of the invention is to provide an electric power steering system that is able to apply more appropriate assist force to a steering system.

An electric power steering system according to an aspect of the invention includes a controller that controls a motor that is a source of an assist force to be applied to a steering system of a vehicle. The controller computes an assist controlled variable based on multiple kinds of state quantities indicating a steering system state, and controls the motor based on the assist controlled variable. The controller individually sets, for the respective state quantities, limits that limit a variation range of the assist controlled variable based on the respective state quantities used to compute the assist controlled variable, and limits a value of the assist controlled variable using the limits.

According to the above aspect, the limits of the assist controlled variable are individually set for the respective state quantities used to compute the assist controlled variable. Even if the assist controlled variable exhibiting an abnormal value is computed for some reason, it is possible to inhibit application of an unintended assist force to a steering system by limiting the variation range of the assist controlled variable using the limits. Because the limits of the assist controlled variable are individually set for the respective state quantities used to compute the assist controlled variable, it is not necessary to taken into account the influence on the control based on another state quantity, thereby making it possible to execute more precise and accurate limiting control on the assist controlled variable.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 9 is a map illustrating the relationship between the steering angular acceleration and the limits in the first embodiment;

FIG. 17 is a map illustrating the relationship among the steering torque, the vehicle speed, and the limits in the fifth embodiment;

FIG. 19 is a map illustrating the relationship among the steering angle, the vehicle speed and the limits in the fifth embodiment;

FIG. 20 is a map illustrating the steering angular velocity, the vehicle speed and the limits in the fifth embodiment;

FIG. 24 is a flowchart illustrating a processing routine executed by an upper and lower limits guard processing unit in the seventh embodiment;

FIG. 32 is a control block diagram of various signal processing units in another embodiment of the invention.

DETAILED DESCRIPTION OF EMBODIMENTS

Figure 1:
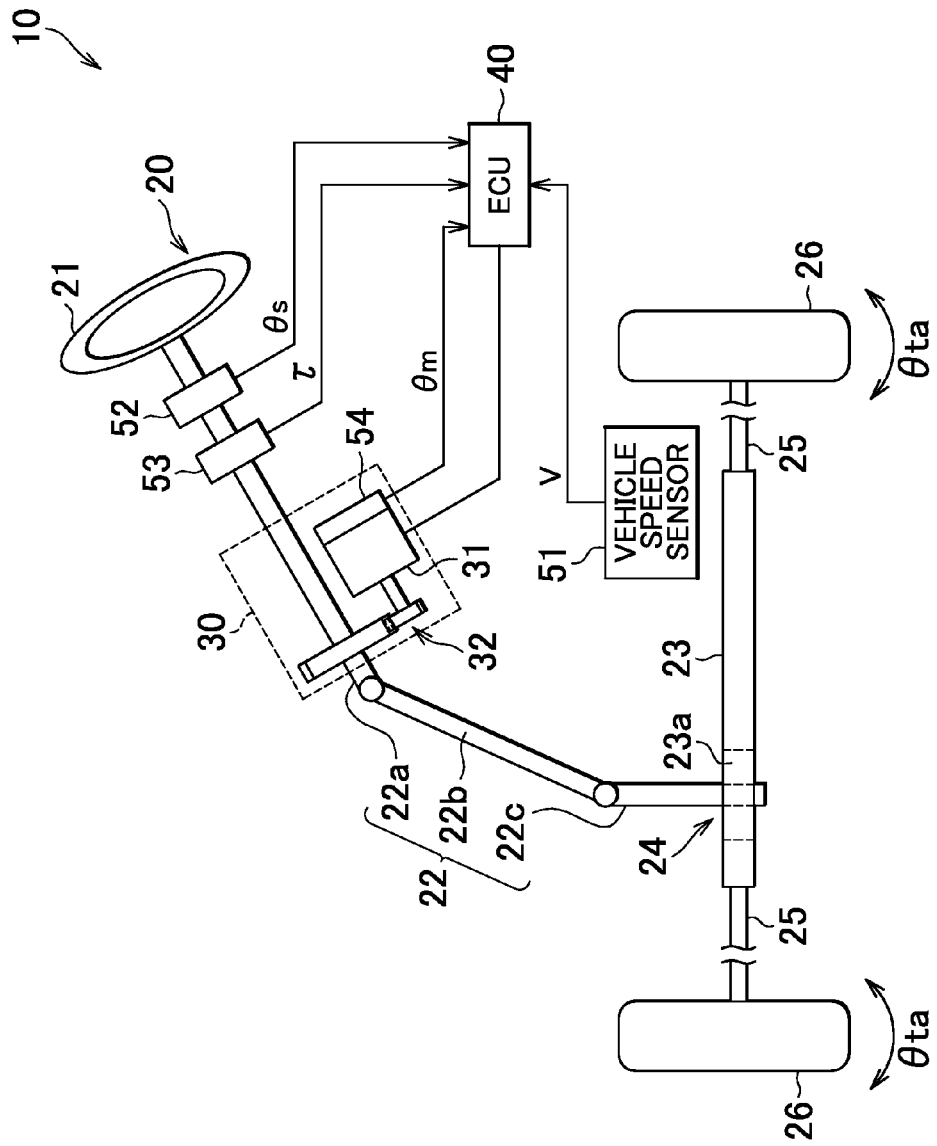
FIG. 1 is a schematic diagram illustrating the configuration of an electric power steering system according to a first embodiment of the invention.

Hereinafter, an electric power steering system according to a first embodiment of the invention will be described with reference to the accompanying drawings. First, the configuration of an electric power steering system (EPS) 10 will be briefly described. As illustrated in FIG. 1, the electric power steering system 10 includes a steering mechanism 20 that steers steered wheels in response to a driver's steering operation, a steering assist mechanism 30 that assists the driver's steering operation, and an electronic controller (ECU) 40 that controls the operation of the steering assist mechanism 30.

The steering mechanism 20 includes a steering wheel 21 that is operated by a driver and a steering shaft 22 that rotates together with the steering wheel 21. The steering shaft 22 includes a column shaft 22a connected to the center of the steering wheel 21, an intermediate shaft 22b connected to the lower end of the column shaft 22a, and a pinion shaft 22c connected to the lower end of the intermediate shaft 22b. The lower end of the pinion shaft 22c engages with a rack shaft 23 (more specifically, a portion 23a in which rack teeth are formed) extending in a direction intersecting with the pinion shaft 22c. Thus, the rotation of the steering shaft 22 is converted into a reciprocating linear motion of the rack shaft 23 by a rack-and-pinion mechanism 24 including the pinion shaft 22c and the rack shaft 23. The reciprocating linear motion is transmitted to right and left steered wheels 26 via tie rods 25 connected to respective ends of the rack shaft 23, so that a steered angle $\theta ta$ of the steered wheels 26 is changed.

The steering assist mechanism 30 includes a motor 31 that is a source of steering assist force. The motor 31 may be, for example, a brushless motor. The motor 31 is connected to the column shaft 22a via a speed reducer 32. The speed reducer 32 reduces the speed of rotation output from the motor 31, and transmits the rotation with a reduced speed to the column shaft 22a. That is, the torque generated by the motor is applied, as a steering assist force (assist force), to the steering shaft 22, so that the driver's steering operation is assisted.

The ECU 40 acquires results of detection by various sensors installed in a vehicle as the information indicating a command issued by the driver or a travelling state, and controls the motor 31 on the basis of the acquired information.

Examples of the sensors include a vehicle speed sensor 51, a steering sensor 52, a torque sensor 53, and a rotation angle sensor 54. The vehicle speed sensor 51 detects a vehicle speed V (a travelling speed of the vehicle). The steering sensor 52 is a magnetic rotation angle sensor provided on the column shaft 22a, and detects a steering angle $\theta s$. The torque sensor 53 is provided on the column shaft 22a, and detects a steering torque $\tau$. The rotation angle sensor 54 is provided on the motor 31, and detects a rotation angle $\theta m$ of the motor 31.

The ECU 40 computes a target assist force on the basis of the vehicle speed V, the steering angle $\theta s$, the steering torque $\tau$, and the rotation angle $\theta m$, and supplies the motor 31 with driving electric power for causing the steering assist mechanism 30 to generate the target assist force.

Figure 2:
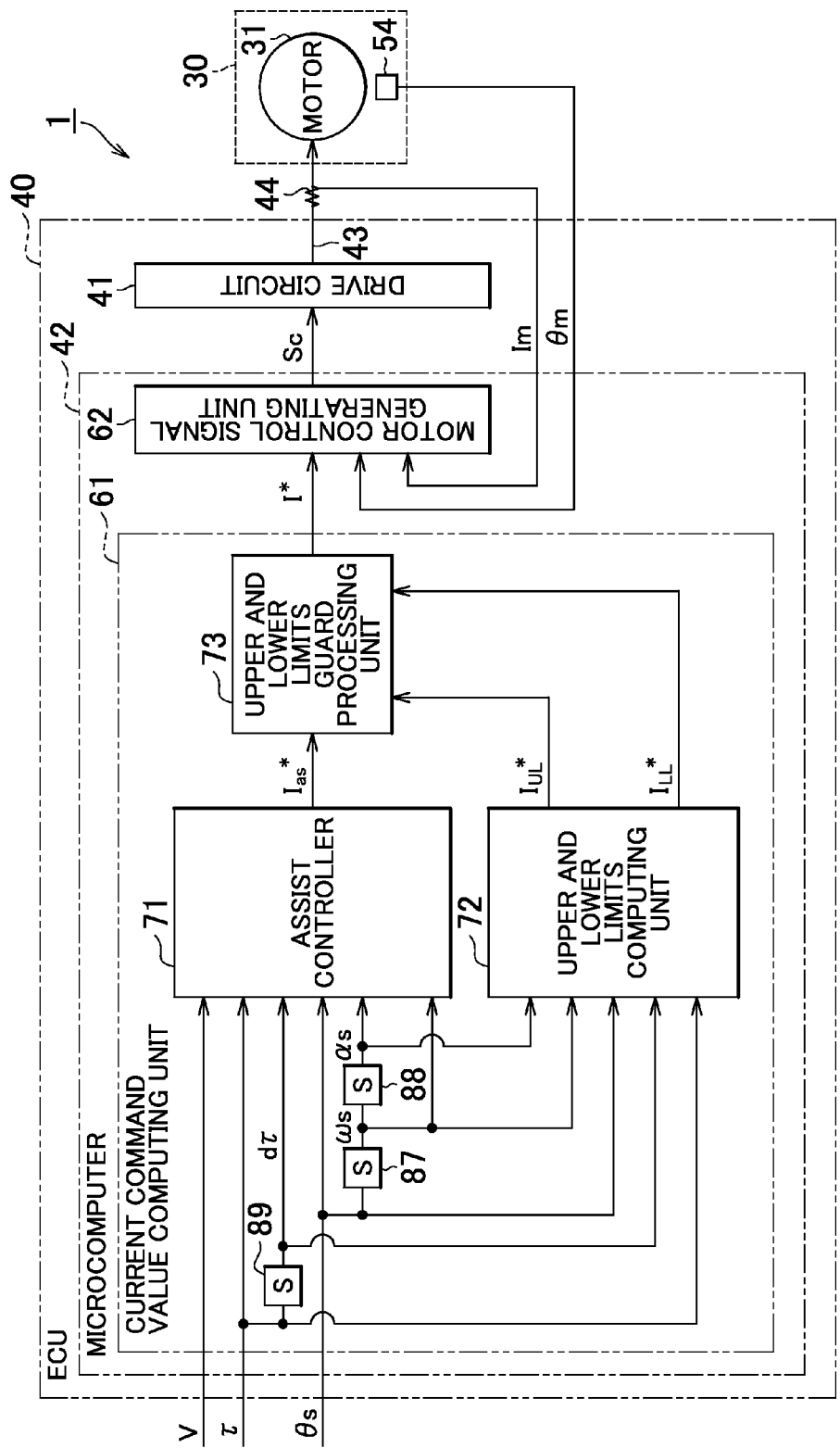
FIG. 2 is a control block diagram of the electric power steering system in the first embodiment.

Next, the hardware configuration of the ECU 40 will be described below. As illustrated in FIG. 2, the ECU 40 includes a drive circuit (inverter circuit) 41 and a microcomputer 42.

The drive circuit 41 converts direct current (DC) power supplied from a direct current (DC) power source such as a battery into three-phase alternating current (AC) power on the basis of a motor control signal Sc (PWM drive signal) generated by the microcomputer 42. The converted three-phase AC power is supplied to the motor 31 via three-phase power supply lines 43. The three-phase power supply lines 43 are provided with current sensors 44. The current sensors 44 detect actual current values Im, which are values of currents flowing through the three-phase power supply lines 43. In FIG. 2, for the purpose of convenience of explanation, the three-phase power supply lines 43 are collectively illustrated as one power supply line, and the three-phase current sensors 44 are collectively illustrated as one current sensor.

The microcomputer 42 receives the results of detection by the vehicle speed sensor 51, the steering sensor 52, the torque sensor 53, the rotation angle sensor 54, and the current sensors 44 with a prescribed sampling period. The microcomputer 42 generates the motor control signal Sc on the basis of the received detection results, that is, the vehicle speed V, the steering angle θs, the steering torque τ, the rotation angle θm, and the actual current values Im.

Next, the functional configuration of the microcomputer 42 will be described below. The microcomputer 42 includes various computation processing units that are realized by executing various control programs stored in a memory (not illustrated).

As illustrated in FIG. 2, the microcomputer 42 includes a current command value computing unit 61 and a motor control signal generating unit 62 as the computation processing units. The current command value computing unit 61 computes a current command value I* on the basis of the steering torque τ, the vehicle speed V, and the steering angle θs. The current command value I* is a command value indicating a current that should be supplied to the motor 31. More specifically, the current command value I* contains a q-axis current command value and a d-axis current command value in a d-q coordinate system. In the present embodiment, the d-axis current command value is set to zero. The d-q coordinate system is a rotating coordinate system based on the rotation angle θm of the motor 31. The motor control signal generating unit 62 converts the three-phase current values Im for the motor 31 into two-phase vector components, that is, a d-axis current value and a q-axis current value in the d-q coordinate system, with the use of the rotation angle θm. The motor control signal generating unit 62 computes a deviation between the d-axis current value and the d-axis current command value and a deviation between the q-axis current value and the q-axis current command value, and generates the motor control signal Sc so as to eliminate the deviations.

Next, the current command value computing unit 61 will be described below. As illustrated in FIG. 2, the current command value computing unit 61 includes an assist controller 71, an upper and lower limits computing unit 72, and an upper and lower limits guard processing unit 73. The current command value computing unit 61 further includes three differentiators 87, 88, 89. The differentiator 87 computes a steering angular velocity ωs by differentiating the steering angle θs. The differentiator 88 computes a steering angular acceleration αs by further differentiating the steering angular velocity ωs computed by the differentiator 87 in the immediately preceding step. The differentiator 89 computes a steering torque derivative value dτ by differentiating the steering torque τ with respect to the time.

The assist controller 71 computes an assist controlled variable $I_{as}^*$ on the basis of the steering torque τ, the vehicle speed V, the steering angle θs, the steering angular velocity ωs, the steering angular acceleration αs, and the steering torque derivative value dτ. The assist controlled variable $I_{as}^*$ is a value of an amount of current (current value) that is supplied to the motor 31 to generate a target assist force with an appropriate magnitude corresponding to these state quantities.

The upper and lower limits computing unit 72 computes an upper limit $I_{UL}^*$ and a lower limit $I_{LL}^*$ as limits of the assist controlled variable $I_{as}^*$ on the basis of various signals used in the assist controller 71, that is, the steering torque τ, the steering angle θs, the steering torque derivative value dτ, the steering angular velocity ωs, and the steering angular acceleration αs. The upper limit $I_{UL}^*$ and the lower limit $I_{LL}^*$ are final limits of the assist controlled variable $I_{as}^*$.

The upper and lower limits guard processing unit 73 executes a process of limiting the assist controlled variable $I_{as}^*$ on the basis of the upper limit $I_{UL}^*$ and the lower limit $I_{LL}^*$ computed by the upper and lower limits computing unit 72. That is, the upper and lower limits guard processing unit 73 compares the value of the assist controlled variable $I_{as}^*$ with the upper limit $I_{UL}^*$ and the lower limit $I_{LL}^*$. The upper and lower limits guard processing unit 73 limits the assist controlled variable $I_{as}^*$ to the upper limit $I_{UL}^*$ when the assist controlled variable $I_{as}^*$ is greater than the upper limit $I_{UL}^*$, and limits the assist controlled variable $I_{as}^*$ to the lower limit $I_{LL}^*$ when the assist controlled variable $I_{as}^*$ is less than the lower limit $I_{LL}^*$. The assist controlled variable $I_{as}^*$ that has been subjected to the limiting process is used as the final current command value I*. When the assist controlled variable $I_{as}^*$ is within a range between the upper limit $I_{UL}^*$ and the lower limit $I_{LL}^*$, inclusive, the assist controlled variable $I_{as}^*$ computed by the assist controller 71 is used as the final current command value I* without any change.

Figure 3:
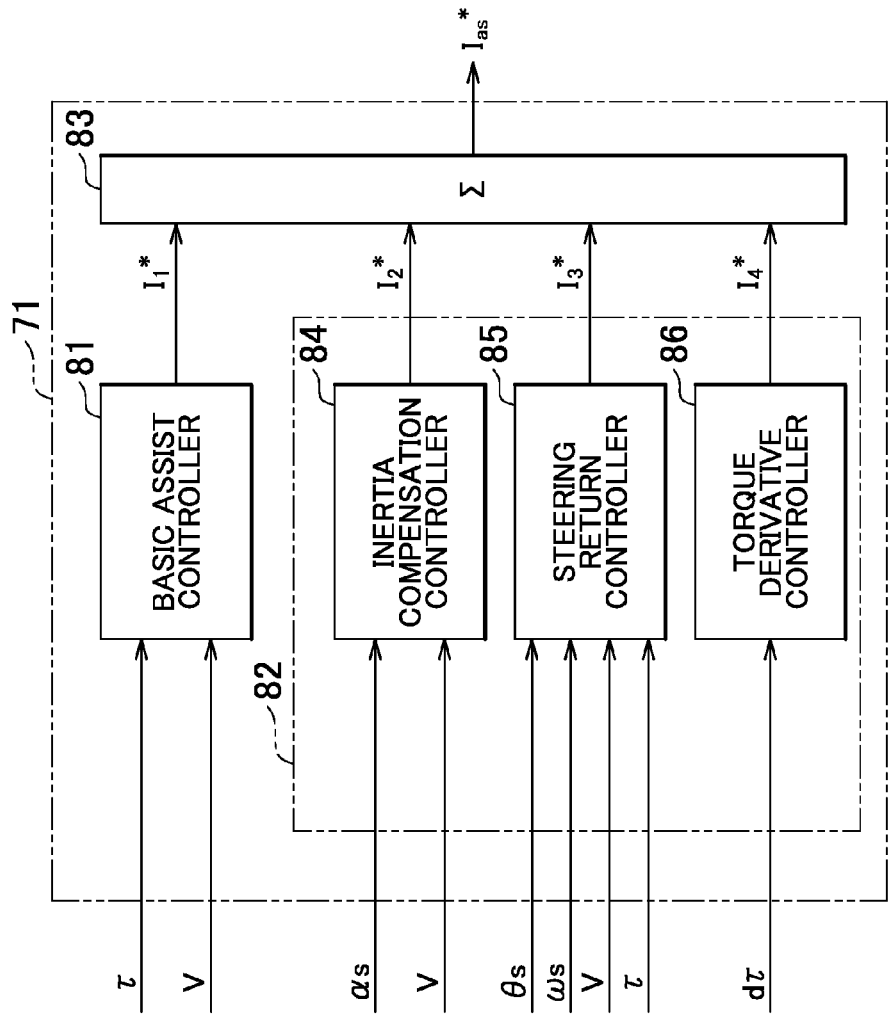
FIG. 3 is a control block diagram of an assist controller in the first embodiment.

Next, the assist controller 71 will be described below in detail. As illustrated in FIG. 3, the assist controller 71 includes a basic assist controller 81, a compensation controller 82, and an adder 83.

The basic assist controller 81 computes a basic assist controlled variable $I_1^*$ on the basis of the steering torque τ and the vehicle speed V. The basic assist controlled variable $I_1^*$ is a basic component (current value) for generating the target assist force with an appropriate magnitude corresponding to the steering torque τ and the vehicle speed V. The basic assist controller 81 computes the basic assist controlled variable $I_1^*$, for example, using an assist characteristic map stored in a memory (not illustrated) of the microcomputer 42. The assist characteristic map is a vehicle speed-sensitive three-dimensional map for computing the basic assist controlled variable $I_1^*$ on the basis of the steering torque τ and the vehicle speed V, and is set such that the basic assist controlled variable $I_1^*$ having a larger value (absolute value) is computed as the steering torque τ (absolute value) becomes larger and the vehicle speed V becomes lower. The compensation controller 82 executes various compensation controls on the basic assist controlled variable $I_1^*$ to allow the driver to gain a better steering feel. The compensation controller 82 includes an inertia compensation controller 84, a steering return controller 85, and a torque derivative controller 86.

The inertia compensation controller 84 computes a compensation amount $I_2^*$ (current value) for compensating for the inertia of the motor 31 on the basis of the steering angular acceleration αs and the vehicle speed V. By correcting the basic assist controlled variable $I_1^*$ using the compensation amount $I_2^*$, a delay in response of the steering assist mechanism to a steering operation (slow rise of assist torque) of the steering wheel 21 at the start of the steering operation and an excessive response to the steering operation (overshooting) at the end of the steering operation are suppressed.

The steering return controller 85 computes a compensation amount $I_3^*$ (current value) for compensating for return characteristics of the steering wheel 21 on the basis of the steering torque τ, the vehicle speed V, the steering angle θs, and the steering angular velocity ωs. By correcting the basic assist controlled variable $I_1^*$ using the compensation amount $I_3^*$, excess or deficiency of self-aligning torque due to a road reaction force is compensated for. This is because an assist force headed in such a direction as to return the steering wheel 21 to the neutral position is generated based on the compensation amount $I_3^*$.

The torque derivative controller 86 detects a reverse input vibration component as the steering torque derivative value dτ, and computes a compensation amount $I_4^*$ (current value) for compensating for disturbance such as reverse input vibration on the basis of the detected steering torque derivative value dτ. By correcting the basic assist controlled variable $I_1^*$ using the compensation amount $I_4^*$, disturbance such as brake vibration generated due to a braking operation is suppressed. This is because an assist force headed in such a direction as to cancel out the reverse input vibration is generated based on the compensation amount $I_4^*$.

The adder 83 generates the assist controlled variable $I_{as}^*$ by adding the compensation amount $I_2^*$, the compensation amount $I_3^*$, and the compensation amount $I_4^*$ to the basic assist controlled variable $I_1^*$, as a process of correcting the basic assist controlled variable $I_1^*$.

Figure 4:
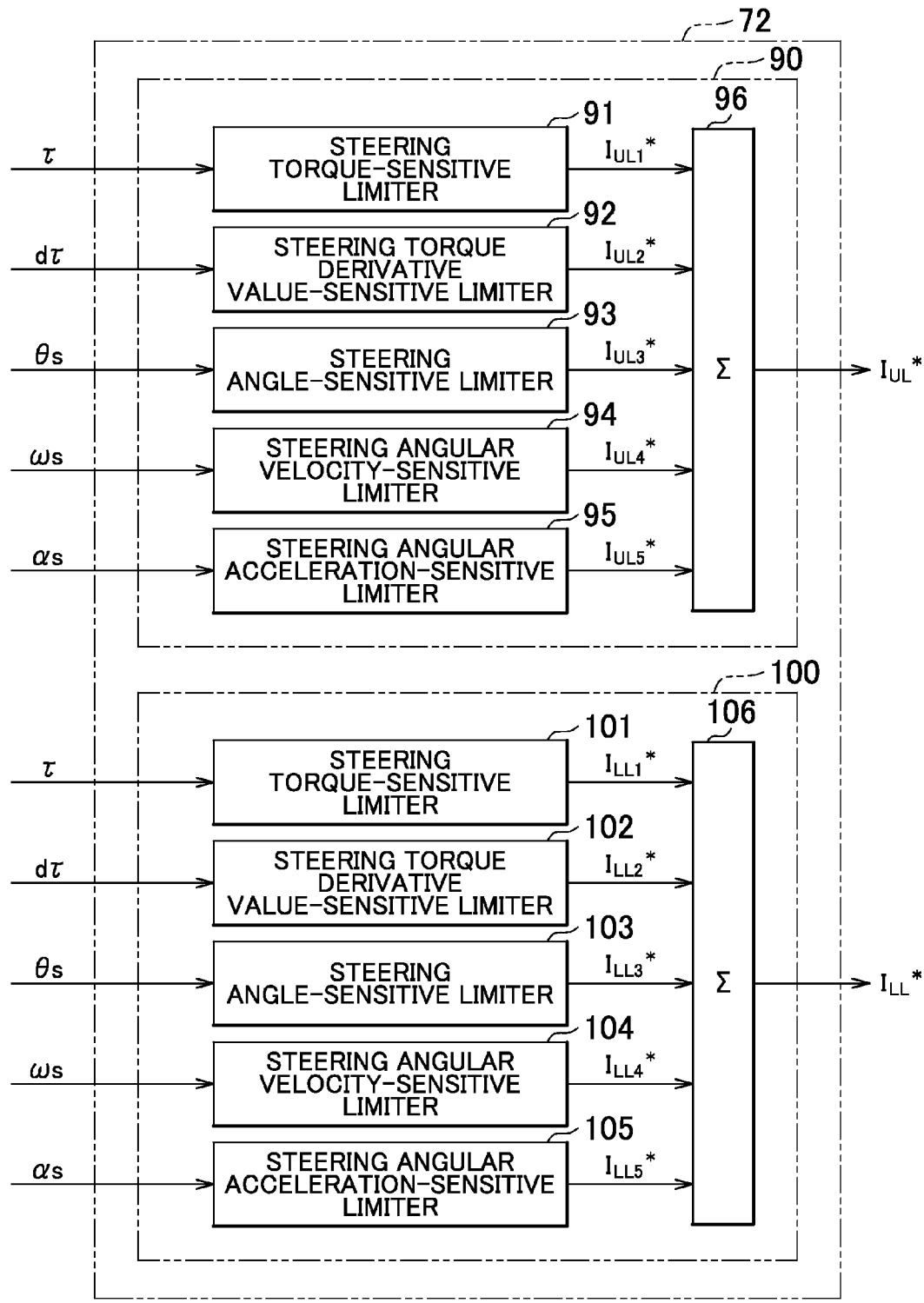
FIG. 4 is a control block diagram of an upper and lower limits computing unit in the first embodiment.

Next, the upper and lower limits computing unit 72 will be described below in detail. As illustrated in FIG. 4, the upper and lower limits computing unit 72 includes an upper limit computing unit 90 and a lower limit computing unit 100. The upper limit computing unit 90 includes a steering torque-sensitive limiter 91, a steering torque derivative value-sensitive limiter 92, a steering angle-sensitive limiter 93, a steering angular velocity-sensitive limiter 94, a steering angular acceleration-sensitive limiter 95, and an adder 96.

The steering torque-sensitive limiter 91 computes the upper limit $I_{UL1}^*$ of the assist controlled variable $I_{as}^*$ on the basis of the steering torque τ. The steering torque derivative value-sensitive limiter 92 computes the upper limit $I_{UL2}^*$ of the assist controlled variable $I_{as}^*$ on the basis of the steering torque derivative value dτ. The steering angle-sensitive limiter 93 computes the upper limit $I_{UL1}^*$ of the assist controlled variable $I_{as}^*$ on the basis of the steering angle θs. The steering angular velocity-sensitive limiter 94 computes the upper limit $I_{UL4}^*$ of the assist controlled variable $I_{as}^*$ on the basis of the steering angular velocity ωs. The steering angular acceleration-sensitive limiter 95 computes the upper limit $I_{UL5}^*$ of the assist controlled variable $I_{as}^*$ on the basis of the steering angular acceleration αs.

The adder 96 generates the upper limit $I_{UL}^*$ of the assist controlled variable $I_{as}^*$ by adding the five upper limits $I_{UL1}^*$ to $I_{UL5}^*$ together. The lower limit computing unit 100 includes a steering torque-sensitive limiter 101, a steering torque derivative value-sensitive limiter 102, a steering angle-sensitive limiter 103, a steering angular velocity-sensitive limiter 104, a steering angular acceleration-sensitive limiter 105, and an adder 106.

The steering torque-sensitive limiter 101 computes the lower limit $I_{LL1}^*$ of the assist controlled variable $I_{as}^*$ on the basis of the steering torque τ. The steering torque derivative value-sensitive limiter 102 computes the lower limit $I_{LL2}^*$ of the assist controlled variable $I_{as}^*$ on the basis of the steering torque derivative value dτ. The steering angle-sensitive limiter 103 computes the lower limit $I_{LL3}^*$ of the assist controlled variable $I_{as}^*$ on the basis of the steering angle θs. The steering angular velocity-sensitive limiter 104 computes the lower limit $I_{LL4}^*$ of the assist controlled variable $I_{as}^*$ on the basis of the steering angular velocity ωs. The steering angular acceleration-sensitive limiter 105 computes the lower limit $I_{LL5}^*$ of the assist controlled variable $I_{as}^*$ on the basis of the steering angular acceleration αs.

The adder 106 generates the lower limit $I_{LL}^*$ of the assist controlled variable $I_{as}^*$ by adding the five lower limits $I_{LL1}^*$ to $I_{as}^*$ together. The upper limit computing unit 90 and the lower limit computing unit 100 compute the upper limits $I_{UL1}^*$ to $I_{UL5}^*$ and the lower limits $I_{LL1}^*$ to $I_{LL5}^*$ using first to fifth limit maps M1 to M5. The first to fifth limit maps M1 to M5 are stored in a memory (not illustrated) of the microcomputer 42. The first to fifth limit maps M1 to M5 are set on the basis of a concept that the assist controlled variable $I_{as}^*$ computed based on the driver's steering operation is permitted and an abnormal assist controlled variable $I_{as}^*$ due to some other reason is not permitted.

Figure 5:
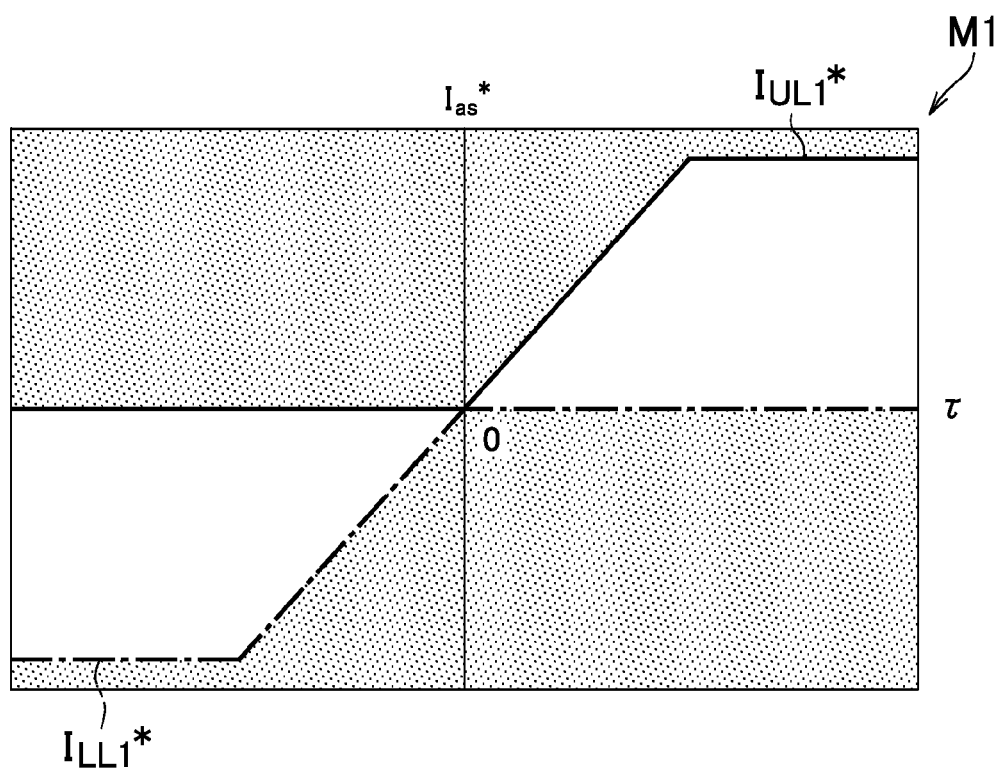
FIG. 5 is a map illustrating the relationship between the steering torque and the limits in the first embodiment.

As illustrated in FIG. 5, the first limit map M1 is a map in which the abscissa axis represents the steering torque τ and the ordinate axis represents the assist controlled variable $I_{as}^*$, and defines a relationship between the steering torque τ and the upper limit $I_{UL1}^*$ of the assist controlled variable $I_{as}^*$ and a relationship between the steering torque τ and the lower limit $I_{LL1}^*$ of the assist controlled variable $I_{as}^*$. The steering torque-sensitive limiters 91, 101 respectively compute the upper limit $I_{UL1}^*$ and the lower limit $I_{LL1}^*$ based on the steering torque τ using the first limit map M1.

The first limit map M1 is set on the basis of a concept that the assist controlled variable $I_{as}^*$ having the same sign (positive sign or negative sign) as that of the steering torque τ is permitted and the assist controlled variable $I_{as}^*$ having the sign different from that of the steering torque τ is not permitted, and thus has the following characteristics. That is, when the steering torque τ is a positive value, the upper limit $I_{UL1}^*$ of the assist controlled variable $I_{as}^*$ increases in the positive direction with an increase in the steering torque τ, and is maintained at a constant positive value after the steering torque τ reaches a prescribed value. When the steering torque τ is a positive value, the lower limit $I_{LL1}^*$ of the assist controlled variable $I_{as}^*$ is maintained at zero. On the other and, when the steering torque τ is a negative value, the upper limit $I_{UL1}^*$ of the assist controlled variable $I_{as}^*$ is maintained at zero. When the steering torque τ is a negative value, the lower limit $I_{LL1}^*$ of the assist controlled variable $I_{as}^*$ increases in the negative direction with an increase in the absolute value of the steering torque τ, and is maintained at a constant negative value after the steering torque τ reaches a prescribed value.

Figure 6:
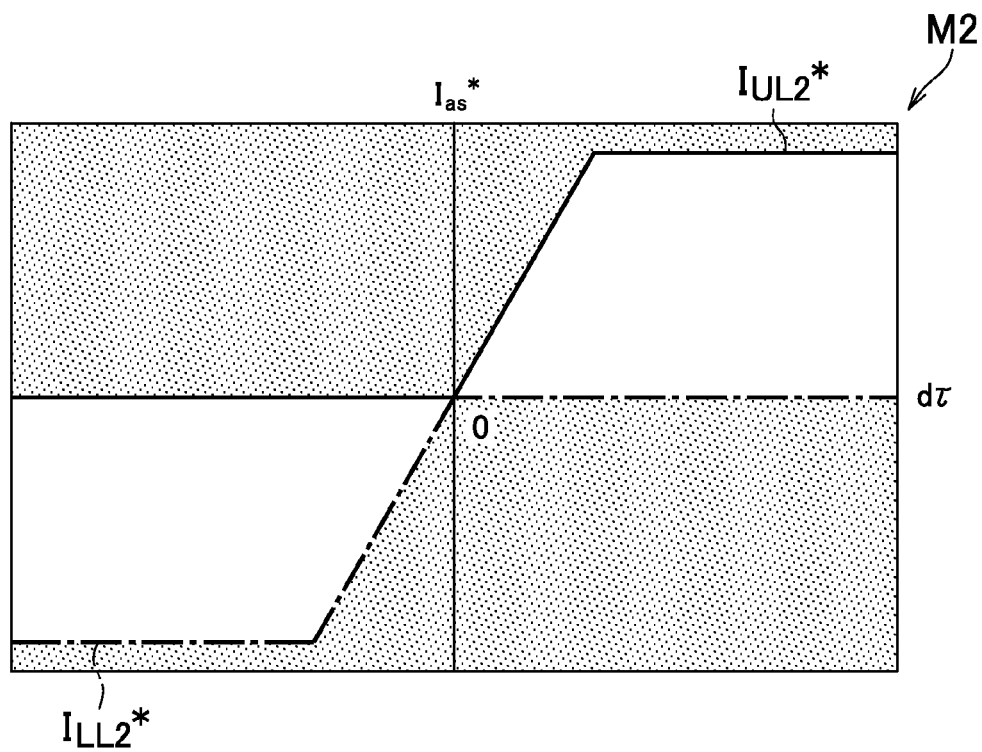
FIG. 6 is a map illustrating the relationship between the steering torque derivative value and the limits in the first embodiment.

As illustrated in FIG. 6, the second limit map M2 is a map in which the abscissa axis represents the steering torque derivative value dτ and the ordinate axis represents the assist controlled variable $I_{as}^*$, and defines a relationship between the steering torque derivative value dτ and the upper limit $I_{UL2}^*$ of the assist controlled variable $I_{as}^*$ and a relationship between the steering torque derivative value dτ and the lower limit $I_{LL2}^*$ of the assist controlled variable $I_{as}^*$. The steering torque derivative value-sensitive limiters 92, 102 respectively compute the upper limit $I_{UL2}^*$ and the lower limit $I_{LL2}^*$ based on the steering torque derivative value dτ using the second limit map M2.

The second limit map M2 is set on the basis of a concept that the assist controlled variable $I_{as}^*$ having the same sign (positive sign or negative sign) as that of the steering torque derivative value dτ is permitted and the assist controlled variable $I_{as}^*$ having the sign different from that of the steering torque derivative value dτ is not permitted, and thus has the following characteristics. That is, when the steering torque derivative value dτ is a positive value, the upper limit $I_{UL2}^*$ of the assist controlled variable $I_{as}^*$ increases in the positive direction with an increase in the steering torque derivative value dτ, and is maintained at a constant positive value after the steering torque derivative value dτ reaches a prescribed value. When the steering torque derivative value dτ is a positive value, the lower limit $I_{LL2}^*$ of the assist controlled variable $I_{as}^*$ is maintained at zero. On the other hand, when the steering torque derivative value dτ is a negative value, the upper limit $I_{UL2}^*$ of the assist controlled variable $I_{as}^*$ is maintained at zero. When the steering torque derivative value dτ is a negative value, the lower limit $I_{LL2}^*$ of the assist controlled variable $I_{as}^*$ increases in the negative direction with an increase in the absolute value of the steering torque derivative value dτ, and is maintained at a constant negative value after the steering torque derivative value dτreaches a prescribed value.

Figure 7:
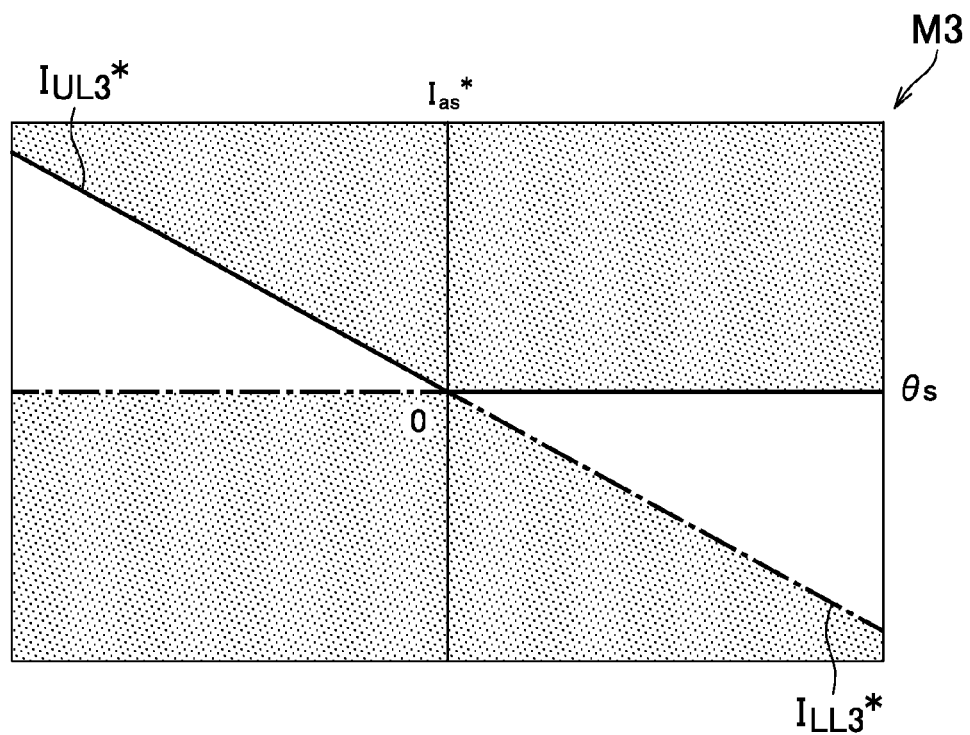
FIG. 7 is a map illustrating the relationship between the steering angle and the limits in the first embodiment.

As illustrated in FIG. 7, the third limit map M3 is a map in which the abscissa axis represents the steering angle θs and the ordinate axis represents the assist controlled variable $I_{as}^*$, and defines a relationship between the steering angle θs and the upper limit $I_{UL3}^*$ of the assist controlled variable $I_{as}^*$ and a relationship between the steering angle θs and the lower limit $I_{LL3}^*$ of the assist controlled variable $I_{as}^*$. The steering angle-sensitive limiters 93, 103 respectively compute the upper limit $I_{UL3}^*$ and the lower limit $I_{LL3}^*$ based on the steering angle θs using the third limit map M3.

The third limit map M3 is set on the basis of a concept that the assist controlled variable $I_{as}^*$ that is opposite in sign (positive sign or negative sign) to the steering angle θs is permitted and the assist controlled variable $I_{as}^*$ having the same sign as that of the steering angle θs is not permitted, and thus has the following characteristics. That is, when the steering angle θs is a positive value, the upper limit $I_{UL3}^*$ of the assist controlled variable $I_{as}^*$ is maintained at zero. When the steering angle θs is a positive value, the lower limit $I_{LL3}^*$ of the assist controlled variable $I_{as}^*$ increases in the negative direction with an increase in the steering angle θs. On the other hand, when the steering angle θs is a negative value, the upper limit $I_{UL3}^*$ of the assist controlled variable $I_{as}^*$ increases in the positive direction with an increase in the absolute value of the steering angle θs. When the steering angle θs is a negative value, the lower limit $I_{LL3}^*$ of the assist controlled variable $I_{as}^*$ is maintained at zero.

Figure 8:
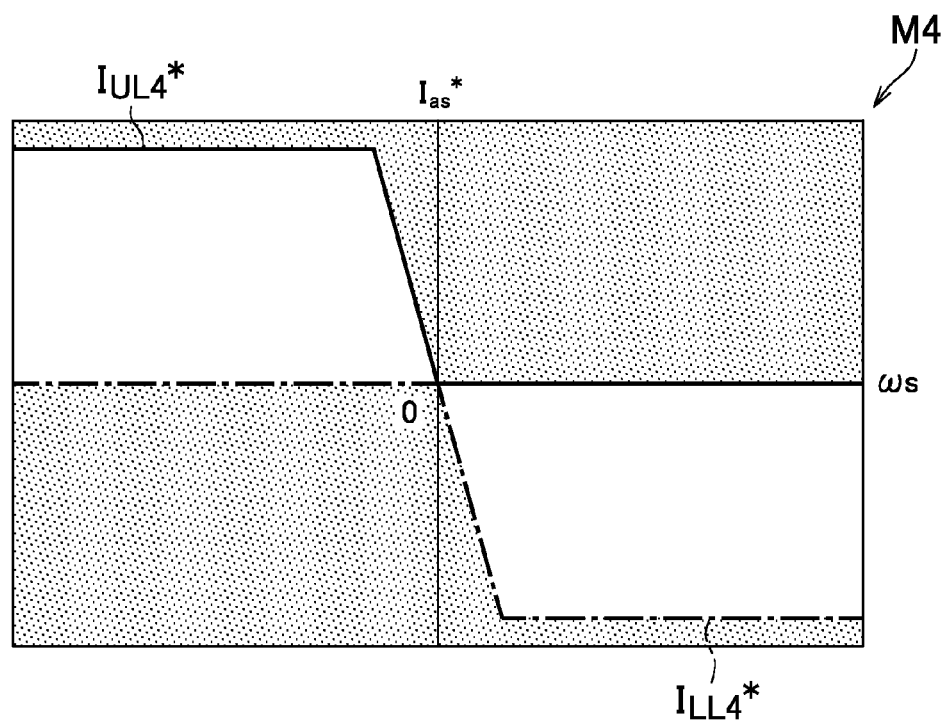
FIG. 8 is a map illustrating the relationship between the steering angular velocity and the limits in the first embodiment.

As illustrated in FIG. 8, the fourth limit map M4 is a map in which the abscissa axis represents the steering angular velocity ωs and the ordinate axis represents the assist controlled variable $I_{as}^*$, and defines a relationship between the steering angular velocity ωs and the upper limit $I_{UL4}^*$ of the assist controlled variable $I_{as}^*$ and a relationship between the steering angular velocity ωs and the lower limit $I_{LL4}^*$ of the assist controlled variable $I_{as}^*$. The steering angular velocity-sensitive limiters 94, 104 respectively compute the upper limit $I_{UL4}^*$ and the lower limit $I_{LL4}^*$ based on the steering angular velocity ωs using the fourth limit map M4.

The fourth limit map M4 is set on the basis of a concept that the assist controlled variable $I_{as}^*$ that is opposite in sign (positive sign or negative sign) to the steering angular velocity ωs is permitted and the assist controlled variable $I_{as}^*$ having the same sign as that of the steering angular velocity ωs is not permitted, and thus has the following characteristics. That is, when the steering angular velocity ωs is a positive value, the upper limit $I_{UL4}^*$ of the assist controlled variable $I_{as}^*$ is maintained at zero. When the steering angular velocity ωs is a positive value, the lower limit $I_{LL4}^*$ of the assist controlled variable $I_{as}^*$ increases in the negative direction with an increase in the steering angular velocity ωs, and is maintained at a constant negative value after the steering angular velocity ωs reaches a prescribed value. On the other hand, when the steering angular velocity ωs is a negative value, the upper limit $I_{UL4}^*$ of the assist controlled variable $I_{as}^*$ increases in the positive direction with an increase in the absolute value of the steering angular velocity θs, and is maintained at a constant positive value after the steering angular velocity ωs reaches a prescribed value. When the steering angular velocity ωs is a negative value, the lower limit $I_{LL4}^*$ of the assist controlled variable $I_{as}^*$ is maintained at zero.

As illustrated in FIG. 9, the fifth limit map M5 is a map in which the abscissa axis represents the steering angular acceleration αs and the ordinate axis represents the assist controlled variable $I_{as}^*$, and defines a relationship between the steering angular acceleration αs and the upper limit $I_{UL5}^*$ of the assist controlled variable $I_{as}^*$ and a relationship between the steering angular acceleration αs and the lower limit $I_{LL5}^*$ of the assist controlled variable $I_{as}^*$. The steering angular acceleration-sensitive limiters 95, 105 respectively compute the upper limit $I_{UL5}^*$ and the lower limit $I_{LL5}^*$ based on the steering angular acceleration αs using the fifth limit map M5.

The fifth limit map M5 is set on the basis of a concept that the assist controlled variable $I_{as}^*$ that is opposite in sign (positive sign or negative sign) to the steering angular acceleration αs is permitted and the assist controlled variable $I_{as}^*$ having the same sign as that of the steering angular acceleration αs is not permitted, and thus has the following characteristics. That is, when the steering angular acceleration αs is a positive value, the upper limit $I_{UL5}^*$ of the assist controlled variable $I_{as}^*$ is maintained at zero. When the steering angular acceleration αs is a positive value, the lower limit $I_{LL5}^*$ of the assist controlled variable $I_{as}^*$ increases in the negative direction with an increase in the steering angular acceleration αs, and is maintained at a constant negative value after the steering angular acceleration αs reaches a prescribed value. On the other hand, when the steering angular acceleration αs is a negative value, the upper limit $I_{UL5}^*$ of the assist controlled variable $I_{as}^*$ increases in the positive direction with an increase in the absolute value of the steering angular acceleration αs, and is maintained at a constant positive value after the steering angular acceleration αs reaches a prescribed value. When the steering angular acceleration αs is a negative value, the lower limit $I_{LL5}^*$ of the assist controlled variable $I_{as}^*$ is maintained at zero.

The operation of the electric power steering system 10 having the above-described configuration will be described below. The limits (the upper limit and the lower limit) of the assist controlled variable $I_{as}^*$ are set individually for the signals used to compute the assist controlled variable $I_{as}^*$, that is, the steering torque τ, the steering torque derivative value dτ, the steering angle θs, the steering angular velocity ωs, and the steering angular acceleration αs, which are the state quantities indicating the steering system state. When computing the final current command value I* on the basis of the assist controlled variable $I_{as}^*$, the microcomputer 42 sets, for the respective signals, the limits for limiting the variation range of the assist controlled variable $I_{as}^*$ on the basis of the values of the signals, and sets values, obtained by adding the limits, as final limits of the assist controlled variable $I_{as}^*$. In addition, the limits for the respective signals and therefore the final limits are set on the basis of a concept that the normal assist controlled variable $I_{as}^*$ computed to in response to the driver's steering operation is permitted and the abnormal assist controlled variable $I_{as}^*$ for some reason is not permitted. The microcomputer 42 permits the compensation amounts based on various compensation controls such as torque derivative control and a steering return control for the driver's steering input, and limits erroneous outputs such as an abnormal output that is greater than the value of each compensation amount.

When the assist controlled variable $I_{as}^*$ falls outside a limit range defined by the final upper limit $I_{UL}^*$ and the final lower limit $I_{LL}^*$, the microcomputer 42 limits the assist controlled variable $I_{as}^*$ so that the assist controlled variable $I_{as}^*$ greater than the upper limit $I_{UL}^*$ or the assist controlled variable $I_{as}^*$ less than the lower limit $I_{LL}^*$ is not supplied, as the final current command value I*, to the motor control signal generating unit 62. The limits (the upper limit and the lower limit) individually set for respective signals are reflected in the final upper limit $I_{UL}^*$ and the final lower limit $I_{LL}^*$. That is, even when the assist controlled variable $I_{as}^*$ exhibiting an abnormal value is computed, the value of the abnormal assist controlled variable $I_{as}^*$ is limited to an appropriate value corresponding to each signal value by the final limits. By supplying the appropriate assist controlled variable $I_{as}^*$, as the final current command value I*, to the motor control signal generating unit 62, an appropriate assist force is applied to the steering system. Because the abnormal assist controlled variable $I_{as}^*$ is prevented from being supplied, as the final current command value I*, to the motor control signal generating unit 62, an unintended assist force is inhibited from being applied to the steering system. For example, occurrence of so-called self-steering is suppressed.

The appropriate limits of the assist controlled variable $I_{as}^*$ are individually set on the basis of the respective signals used to compute the assist controlled variable $I_{as}^*$. Accordingly, more precise limiting process is executed on the assist controlled variable $I_{as}^*$, for example, as compared with the case where the limits of the assist controlled variable $I_{as}^*$ are set on the basis of only the steering torque τ that is a signal used to compute the basic assist controlled variable $I_1^*$. In the setting of the limits of the assist controlled variable $I_{as}^*$, it is no longer necessary to take into account the influence on the various compensation amounts $I_2^*$, $I_3^*$, $I_4^*$.

Therefore, according to the present embodiment, the following advantageous effects of 1) to 3) are obtained.

1) The limits of the assist controlled variable $I_{as}^*$ are individually set for the respective signals (the respective state quantities) used to compute the assist controlled variable $I_{as}^*$, and the values, obtained by adding the limits, are set as the final limits of the assist controlled variable $I_{as}^*$. Accordingly, even when the assist controlled variable $I_{as}^*$ exhibiting an abnormal value is computed for some reason, the abnormal assist controlled variable $I_{as}^*$ is limited to an appropriate value directly based on the signal values by the final limits. By supplying the motor control signal generating unit 62 with the assist controlled variable $I_{as}^*$ limited to an appropriate value as the final current command value I*, it is possible to accurately inhibit application of an unintended assist force to the steering system.

2) The microcomputer 42 collectively executes the limiting process on the assist controlled variable $I_{as}^*$ using the upper limit $I_{UL}^*$ obtained by adding the upper limits $I_{UL1}^*$ to $I_{UL5}^*$ and the lower limit $I_{LL}^*$ obtained by the lower limits $I_{LL1}^*$ to $I_{LL5}^*$. There may be a configuration in which the limiting processes are executed individually on the assist controlled variable $I_{as}^*$ using the respective upper limits $I_{UL1}^*$ to $I_{UL5}^*$ and the respective lower limits $I_{LL1}^*$ to $I_{LL5}^*$. As compared with the case where this configuration is employed, it is possible to reduce a computational load on the microcomputer 42 according to the first embodiment of the invention.

3) The microcomputer 42 is able to easily compute the upper limits $I_{UL1}^*$ to $I_{UL5}^*$ and the lower limits $I_{LL1}^*$ to $I_{LL5}^*$ by using the first to fifth limit maps M1 to M5.

An electric power steering system according to a second embodiment of the invention will be described below. In the first embodiment, the assist controlled variable $I_{as}^*$ continues to be limited by the upper limit $I_{UL}^*$ or the lower limit $I_{LL}^*$ as long as the abnormality of the assist controlled variable $I_{as}^*$ is present. Alternatively, the following configuration may be employed.

Figure 10:
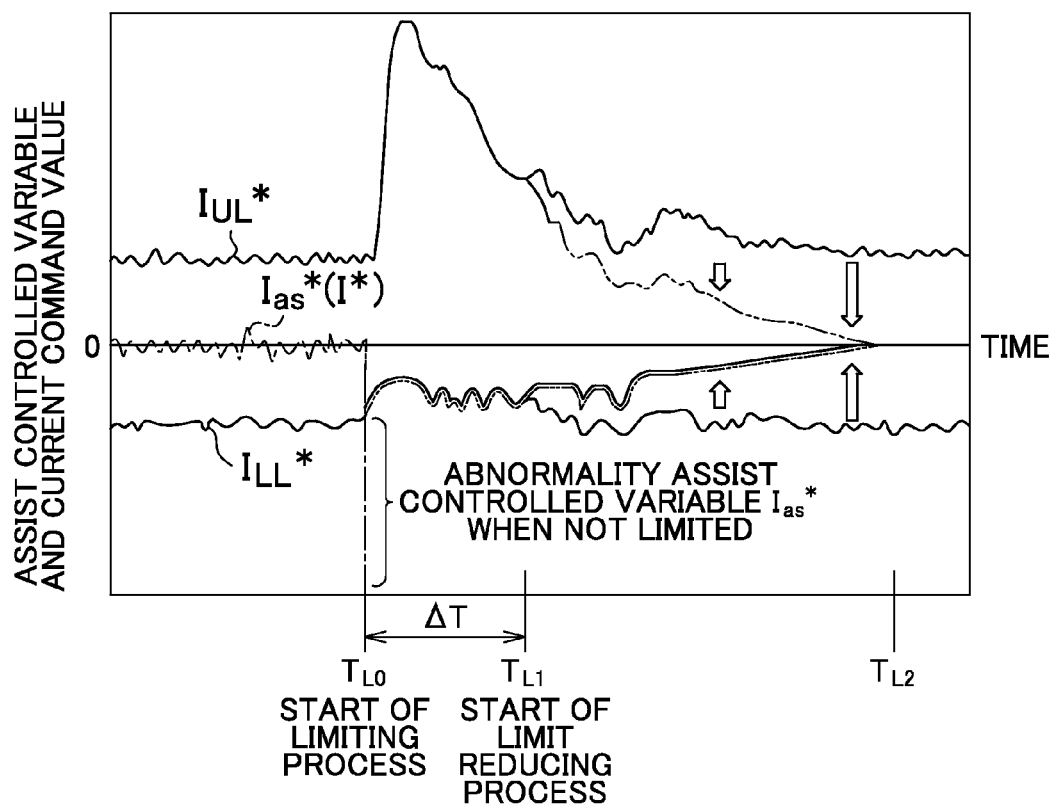
FIG. 10 is a graph illustrating variations of the assist controlled variable and the current command value in a second embodiment of the invention.

As illustrated in a graph in FIG. 10, for example, when the value of the assist controlled variable $I_{as}^*$ is less than the lower limit $I_{LL}^*$ (time $T_{L0}$), the value of the assist controlled variable $I_{as}^*$ is limited to the lower limit $I_{LL}^*$. When the state where the value of the assist controlled variable $I_{as}^*$ is limited to the lower limit $I_{LL}^*$ has continued for a prescribed period ΔT (time $T_{L1}$), the microcomputer 42 gradually decreases the absolute value of the lower limit $I_{LL}^*$ to zero (hereinafter, referred to as "gradual decrease process"). At the timing (time $T_{L2}$) at which the absolute value of the lower limit $I_{LL}^*$ reaches zero, the value of the assist controlled variable $I_{as}^*$ becomes zero. As a result, the application of the assist force to the steering system is stopped. The gradual decrease process is executed on the basis of a concept that the application of the assist force is preferably stopped when the abnormal state has continued for the prescribed period ΔT. The value of the assist controlled variable $I_{as}^*$ gradually decreases and thus the steering feel is not abruptly changed when the assist is stopped. The same is true when the value of the assist controlled variable $I_{as}^*$ is greater than the upper limit $I_{UL}^*$. That is, the microcomputer 42 gradually decreases the upper limit $I_{UL}^*$ to zero when the state where the assist controlled variable $I_{as}^*$ is limited to the upper limit $I_{UL}^*$ has continued for the prescribed period ΔT.

The gradual decrease process is forcibly executed regardless of the process of computing the upper limit $I_{UL}^*$ and the lower limit $I_{LL}^*$. The microcomputer 42 may stop execution of the gradual decrease process when the value of the assist controlled variable $I_{as}^*$ is returned to a value within the normal range between the upper limit $I_{UL}^*$ and the lower limit $I_{LL}^*$, inclusive, during the execution of the gradual decrease process. Accordingly, the upper limit $I_{UL}^*$ or the lower limit $I_{LL}^*$ that is forcibly decreased gradually to zero is returned to the original value.

According to the present embodiment, the following advantageous effect of 4) is obtained in addition to the advantageous effects of 1) and 3) in the first embodiment.

4) When the state where the value of the assist controlled variable $I_{as}^*$ is limited to the upper limit $I_{UL}^*$ or the lower limit $I_{LL}^*$ has continued for the prescribed period ΔT, the upper limit $I_{UL}^*$ or the absolute value of the lower limit $I_{LL}^*$ is gradually decreased to zero. The assist for the steering system is gradually reduced and is stopped finally. Accordingly, it is possible to further improve the safety.

Next, an electric power steering system according to a third embodiment of the invention will be described below. In the present embodiment, there is employed a configuration in which the upper and lower limits computing unit 72 and the upper and lower limits guard processing unit 73 illustrated in FIG. 2 are omitted. The functions of the upper and lower limits computing unit 72 and the upper and lower limits guard processing unit 73 are given to the assist controller 71. In the first embodiment, the upper limit $I_{UL}^*$ and the lower limit $I_{LL}^*$ of the assist controlled variable $I_{as}^*$ are collectively set by the upper and lower limits computing unit 72. However, in the present embodiment, the assist controlled variable $I_{as}^*$ is indirectly limited by individually setting the limits for each of the compensation amounts $I_2^*$, $I_3^*$, $I_4^*$.

Figure 11:
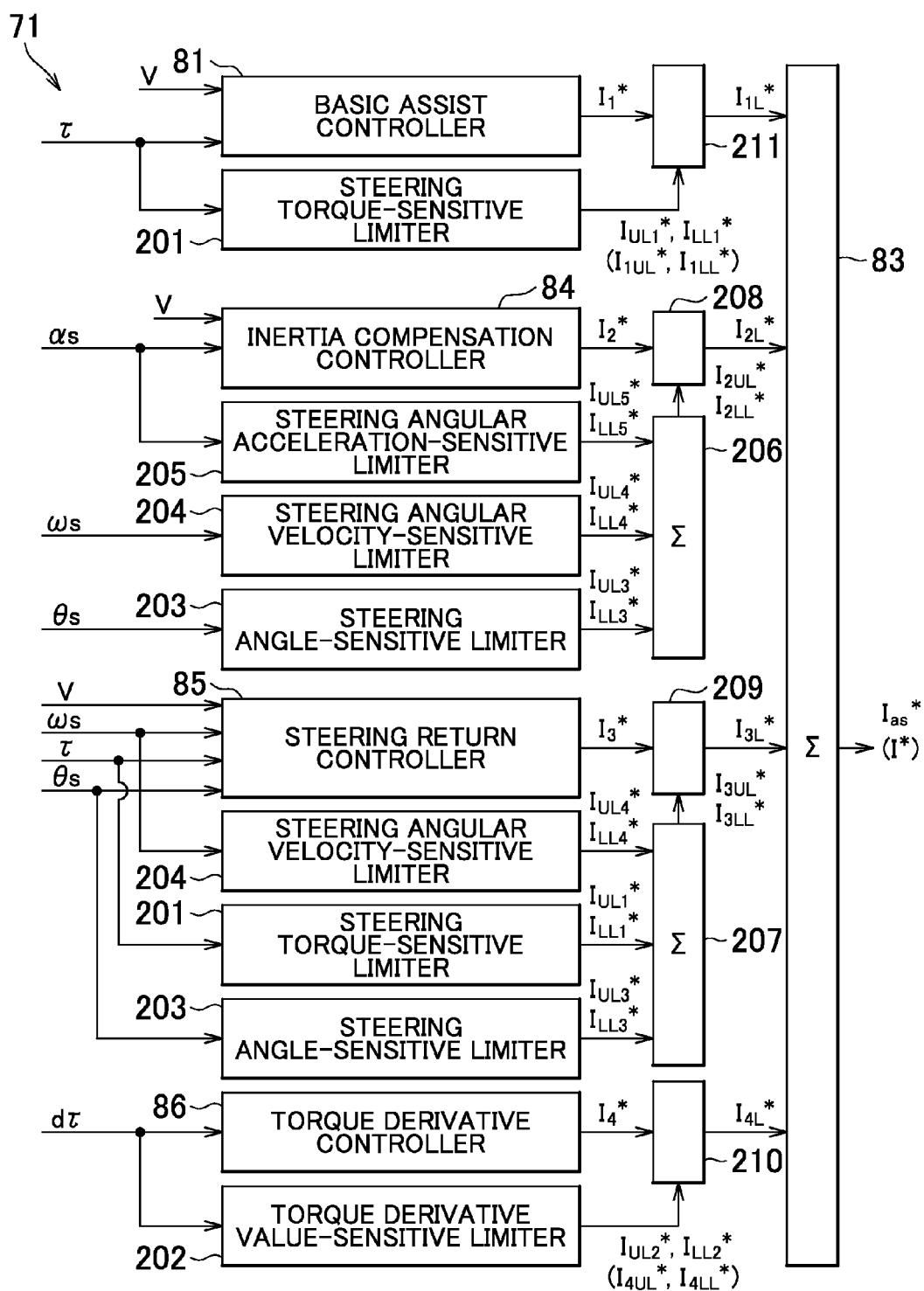
FIG. 11 is a control block diagram of a current command value computing unit in a third embodiment of the invention.

As illustrated in FIG. 11, the assist controller 71 includes a steering torque-sensitive limiter 201, a steering torque derivative value-sensitive limiter 202, a steering angle-sensitive limiter 203, a steering angular velocity-sensitive limiter 204, and a steering angular acceleration-sensitive limiter 205. The assist controller 71 further includes adders 206, 207 and upper and lower limits guard processing units 208, 209, 210, and 211.

In FIG. 11, two steering torque-sensitive limiters 201 and two steering angular velocity-sensitive limiters 204 are illustrated for the purpose of convenience of explanation. However, only one steering torque-sensitive limiter 201 and only one steering angular velocity-sensitive limiter 204 may be provided. In this case, the limits (the upper limits $I_{UL1}^*$, $I_{UL4}^*$ and the lower limits $I_{LL1}^*$, $I_{LL4}^*$) generated by the steering torque-sensitive limiter 201 and the steering angular velocity-sensitive limiter 204 are branched and supplied to relevant elements such as the adders 206, 207 and the upper and lower limits guard processing unit 211.

The steering torque-sensitive limiter 201 has a combination of the functions of the steering torque-sensitive limiters 91, 101 illustrated in FIG. 4. The steering torque-sensitive limiter 201 computes the upper limit $I_{UL1}^*$ and the lower limit $I_{LL1}^*$ of the assist controlled variable $I_{as}^*$ on the basis of the steering torque τ. The torque derivative value-sensitive limiter 202 has a combination of the functions of the steering torque derivative value-sensitive limiters 92, 102 illustrated in FIG. 4. The torque derivative value-sensitive limiter 202 computes the upper limit $I_{UL2}^*$ and the lower limit $I_{LL2}^*$ of the assist controlled variable $I_{as}^*$ on the basis of the steering torque derivative value dτ.

The steering angle-sensitive limiter 203 has a combination of the functions of the steering angle-sensitive limiters 93, 103 illustrated in FIG. 4. The steering angle-sensitive limiter 203 computes the upper limit $I_{UL3}^*$ and the lower limit $I_{LL3}^*$ of the assist controlled variable $I_{as}^*$ on the basis of the steering angle θs.

The steering angular velocity-sensitive limiter 204 has a combination of the functions of the steering angular velocity-sensitive limiters 94, 104 illustrated in FIG. 4. The steering angular velocity-sensitive limiter 204 computes the upper limit $I_{UL4}^*$ and the lower limit $I_{LL4}^*$ of the assist controlled variable $I_{as}^*$ on the basis of the steering angular velocity ωs.

The steering angular acceleration-sensitive limiter 205 has a combination of the functions of the steering angular acceleration-sensitive limiters 95, 105 illustrated in FIG. 4. The steering angular acceleration-sensitive limiter 205 computes the upper limit $I_{UL5}^*$ and the lower limit $I_{LL5}^*$ of the assist controlled variable $I_{as}^*$ on the basis of the steering angular acceleration αs.

The adder 206 computes the limits of the compensation amount $I_2^*$ generated by the inertia compensation controller 84. That is, the adder 206 generates the upper limit $I_{2UL}^*$ of the compensation amount $I_2^*$ by adding the three upper limits $I_{UL3}^*$, $I_{UL4}^*$, $I_{UL5}^*$. The adder 206 also generates the lower limit $I_{2LL}^*$ of the compensation amount $I_2^*$ by adding the three lower limits $I_{LL3}^*$, $I_{LL4}^*$, $I_{LL5}^*$.

The adder 207 computes the limits of the compensation amount $I_3^*$ generated by the steering return controller 85. That is, the adder 207 generates the upper limit $I_{3UL}^*$ of the compensation amount $I_3^*$ by adding the two upper limits $I_{UL1}^*$ and $I_{UL4}^*$ together. The adder 207 also generates the lower limit $I_{3LL}^*$ of the compensation amount $I_3^*$ by adding the two lower limits $I_{LL1}^*$ and $I_{LL4}^*$ together.

The upper and lower limits guard processing unit 208 executes a limiting process on the compensation amount $I_2^*$ generated by the inertia compensation controller 84 on the basis of the upper limit $I_{2UL}^*$ and the lower limit $I_{2LL}^*$ computed by the adder 206. That is, the value of the compensation amount $I_2^*$ is limited to a value within a range defined by the upper limit $I_{2UL}^*$ and the lower limit $I_{2LL}^*$.

The upper and lower limits guard processing unit 209 executes a limiting process on the compensation amount $I_3^*$ generated by the steering return controller 85 on the basis of the upper limit $I_{3UL}^*$ and the lower limit $I_{3LL}^*$ computed by the adder 207. That is, the value of the compensation amount $I_3^*$ is limited to a value within a range defined by the upper limit $I_{3UL}^*$ and the lower limit $I_{3LL}^*$.

The upper and lower limits guard processing unit 210 executes a limiting process on the compensation amount $I_4^*$ using the upper limit $I_{UL2}^*$ and the lower limit $I_{LL2}^*$ computed by the torque derivative value-sensitive limiter 202 without any change, as the upper limit $I_{4UL}^*$ and the lower limit $I_{4LL}^*$ of the compensation amount $I_4^*$ computed by the torque derivative controller 86. That is, the value of the compensation amount $I_4^*$ is limited to a value within a range defined by the upper limit $I_{4UL}^*$ and the lower limit $I_{4LL}^*$.

The upper and lower limits guard processing unit 211 executes a limiting process on the basic assist controlled variable $I_1^*$ using the upper limit $I_{UL1}^*$ and the lower limit $I_{LL1}^*$ computed by the steering torque-sensitive limiter 201 without any change, as the upper limit $I_{1UL}^*$ and the lower limit $I_{1LL}^*$ of the basic assist controlled variable $I_1^*$ computed by the basic assist controller 81. That is, the value of the basic assist controlled variable $I_1^*$ is limited to a value within a range defined by the upper limit $I_{1UL}^*$ and the lower limit $I_{1LL}^*$.

The basic assist controlled variable $I_{1L}^*$ and the three compensation amounts $I_{2L}^*$, $I_{3L}^*$, $I_{4L}^*$ respectively obtained by executing the limiting process on the basic assist controlled variable $I_1^*$ and the three compensation amounts $I_2^*$, $I_3^*$, $I_4^*$ are supplied to the adder 83. The adder 83 generates an assist controlled variable $I_{as}^*$ by adding together the basic assist controlled variable $I_{1L}^*$ and the compensation amounts $I_{2L}^*$, $I_{3L}^*$, $I_{4L}^*$. The assist controlled variable $I_{as}^*$ is supplied, as the final current command value I*, to the motor control signal generating unit 62.

According to the present embodiment, the following advantageous effect of 5) is obtained in addition to the advantageous effects of 1) and 3) in the first embodiment.

5) The limiting process is individually executed on the basic assist controlled variable $I_1^*$ computed by the basic assist controller 81, the compensation amount $I_2^*$ generated by the inertia compensation controller 84, the compensation amount $I_3^*$ generated by the steering return controller 85, and the compensation amount $I_4^*$ generated by the torque derivative controller 86. Accordingly, the assist controlled variable $I_{as}^*$ is more strictly limited on the basis of the values of the signals of the moment in other words, on the basis of the steering system state of the moment.

Next, an electric power steering system according to a fourth embodiment will be described below. In the present embodiment, basically the same configuration as that in the first embodiment illustrated in FIG. 1 to FIG. 9 is employed. Therefore, the same elements as those in the first embodiment will be denoted by the same reference symbols as those in the first embodiment, and description thereof will be omitted.

Figure 12:
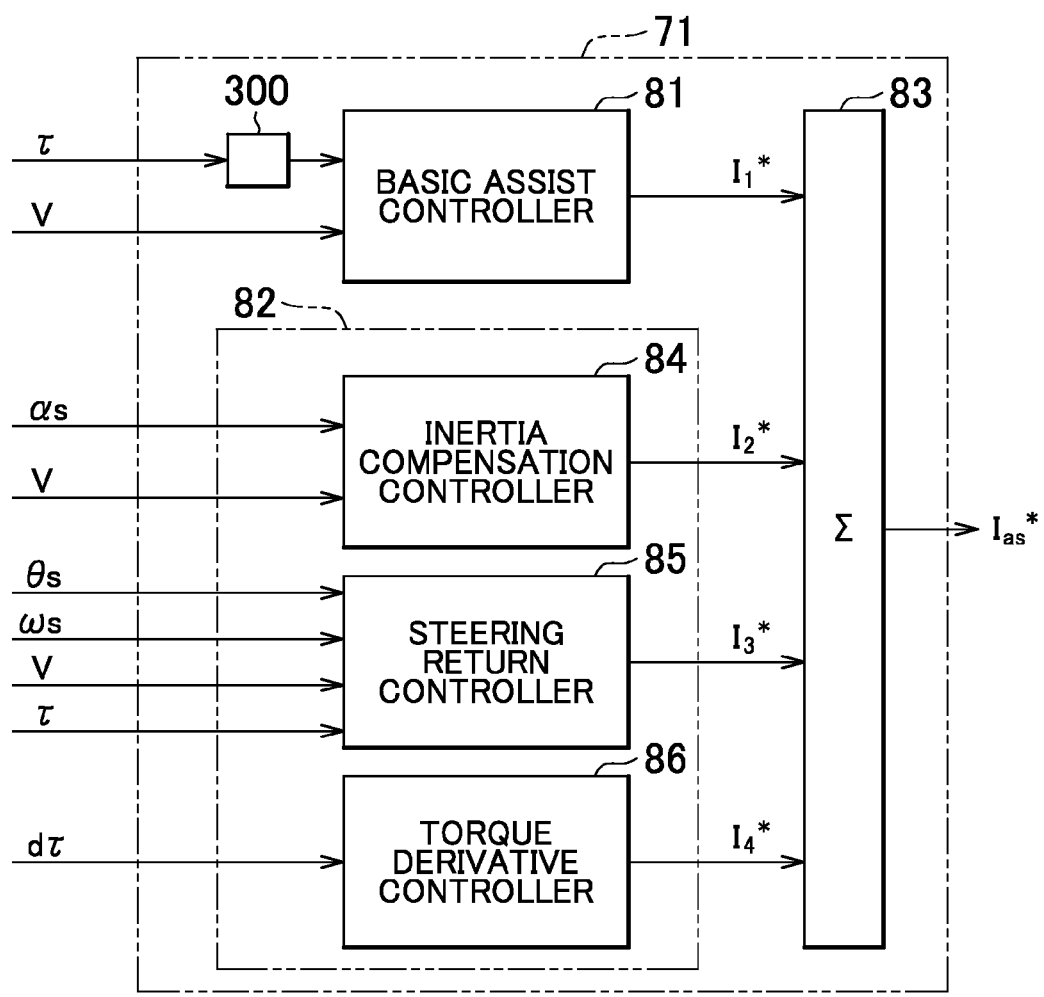
FIG. 12 is a control block diagram of an assist controller in a fourth embodiment of the invention.

Signal paths in the microcomputer 42, for example, input paths and output paths through which electric signals (τ, dτ, θs, ωs, αs) are input into and output from the various controllers (81 to 86) illustrated in FIG. 12, may each be provided with a delay element such as a filter circuit as an element for compensating for the phases of the electric signals or removing noise from the electric signals. The delay elements are provided to stabilize the control system.

As illustrated in FIG. 12, the assist controller 71 has a phase compensator 300. The phase compensator 300 compensates for the phase of the steering torque τ detected by the torque sensor 53. The phase compensator 300 includes, for example, a low-pass filter that is a delay element. Accordingly, the phase of the steering torque τ processed by the phase compensator 300 is delayed with respect to the phase of the steering torque τ before being processed. Therefore, the phase of the basic assist controlled variable $I_1^*$ and therefore the phase of the assist controlled variable $I_{as}^*$ are delayed with respect to the phase of the steering torque τ detected by the torque sensor 53.

The relationship between the assist controlled variable $I_{as}^*$ and the limits will be described below. In this case, the upper limit $I_{UL1}^*$ computed by the steering torque-sensitive limiter 91 illustrated in FIG. 4 will be described as an example of the limits.

When a delay element such as the phase compensator 300 is not present in the upper and lower limits computing unit 72 as illustrated in FIG. 4, the phase of the upper limit $I_{UL1}^*$ generated on the basis of the steering torque τ generally coincides with the phase of the detected steering torque τ. Because the phase compensator 300 includes a delay element as described above, the phase of the assist controlled variable $I_{as}^*$ is delayed with respect to the phase of the detected steering torque τ. Accordingly, the phase of the assist controlled variable $I_{as}^*$ is delayed with respect to the upper limit $I_{UL1}^*$.

Figure 13:
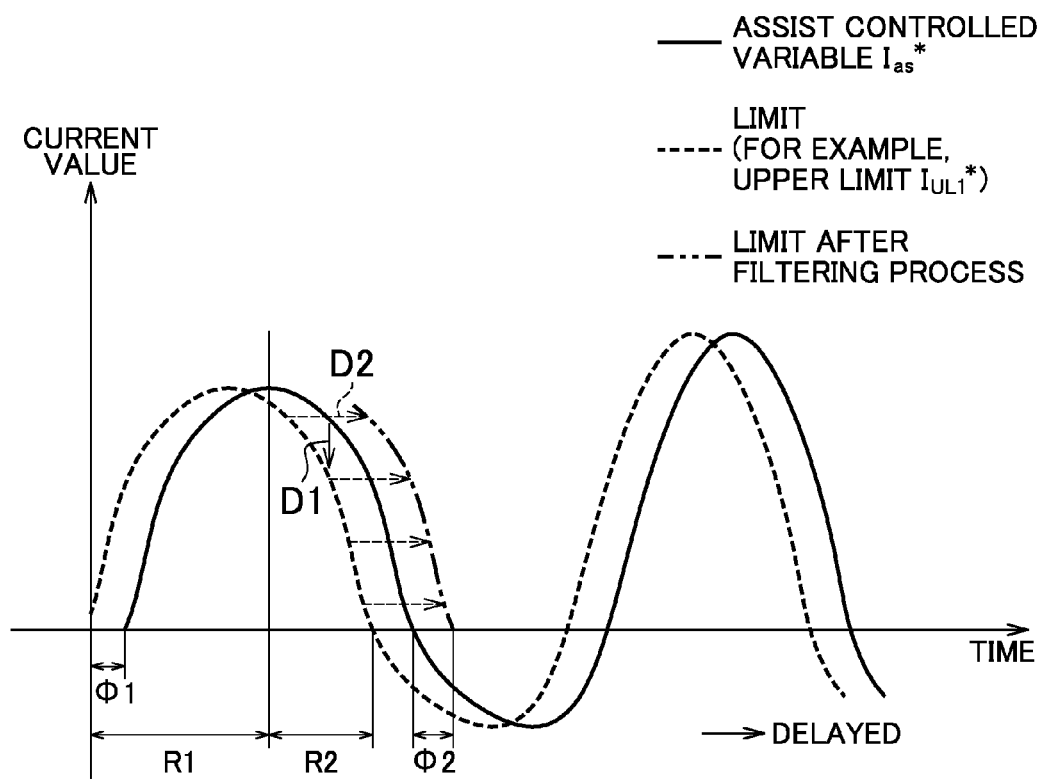
FIG. 13 is a graph illustrating the phases of the assist controlled variable and the limit in the fourth embodiment.

As illustrated in the graph in FIG. 13, the assist controlled variable $I_{as}^*$ and the upper limit $I_{UL1}^*$ repeatedly increase and decrease in response to the steering operation, and the assist controlled variable $I_{as}^*$ is delayed, for example, by a phase φ1 with respect to the upper limit $I_{UL1}^*$. In this case, in a region R1 in which the value of the assist controlled variable $I_{as}^*$ is smaller than the upper limit $I_{UL1}^*$, the value of the assist controlled variable $I_{as}^*$ is not limited. In contrast to this, in a region R2 in which the value of the assist controlled variable $I_{as}^*$ is larger than the upper limit $I_{UL1}^*$, the assist controlled variable $I_{as}^*$ is erroneously limited to the upper limit $I_{UL1}^*$, for example, as indicated by an arrow D1. It is not preferable that the normal value of the assist controlled variable $I_{as}^*$ be erroneously limited just due to the phase delay of the assist controlled variable $I_{as}^*$ with respect to the upper limit $I_{UL1}^*$ as described above.

The same is true on the relationship between the assist controlled variable $I_{as}^*$ and the lower limit $I_{LL1}^*$, the relationships between the assist controlled variable $I_{as}^*$ and the upper limits $I_{UL2}^*$ to $I_{UL5}^*$, and the relationships between the assist controlled variable $I_{as}^*$ and the lower limits $I_{LL2}^*$ to $I_{LL5}^*$. The upper limits $I_{UL2}^*$ to $I_{UL5}^*$ and the lower limits $I_{LL2}^*$ to $I_{LL5}^*$ are limits based on the steering torque derivative value dτ, the steering angle θs, the steering angular velocity ωs, and the steering angular acceleration αs.

In the case where the assist controller 71 including the delay element generates the assist controlled variable $I_{as}^*$, if the upper and lower limits computing unit 72 that does not have a delay element executes a limiting process, the value of the assist controlled variable $I_{as}^*$ may be inappropriately limited. Accordingly, in the present embodiment, the following configuration is employed.

Figure 14:
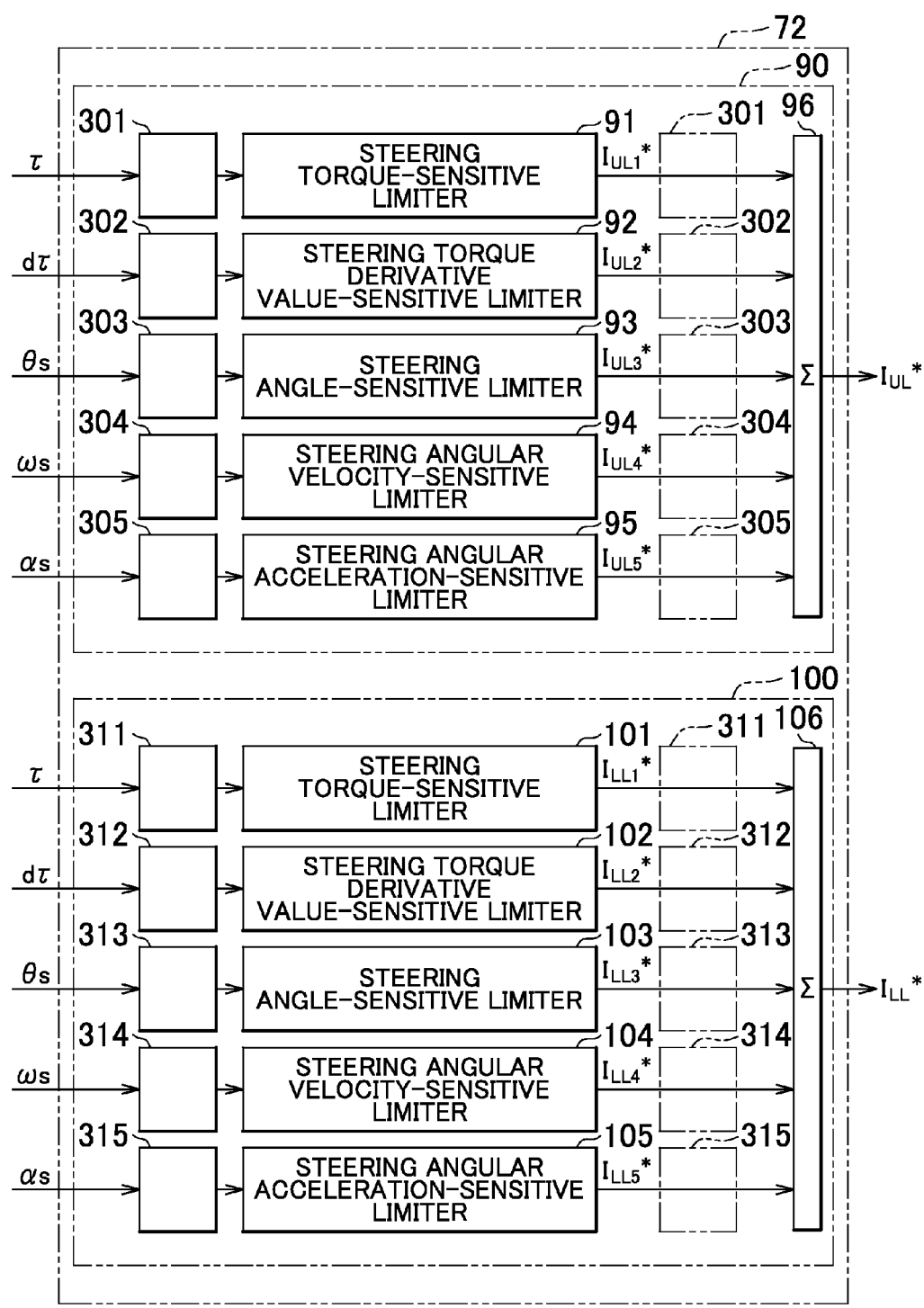
FIG. 14 is a control block diagram of an upper and lower limits computing unit in the fourth embodiment.

As illustrated in FIG. 14, the upper limit computing unit 90 includes five determination units 301 to 305, and the lower limit computing unit 100 includes five determination units 311 to 315. The determination units 301 to 305 and 311 to 315 are installed on the input paths for the signals (τ, dτ, θs, ωs, αs). The determination units 301 to 305 and 311 to 315 determines whether there is a possibility that the normal value of the assist controlled variable $I_{as}^*$ will be erroneously limited due to the phase delay of the assist controlled variable $I_{as}^*$ with respect to the limits ($I_{UL1}^*$ to $I_{UL5}^*$ and $I_{LL1}^*$ to $I_{LL5}^*$). The determination units 301 to 305 and 311 to 315 delay the phases of the limits when it is determined that there is a possibility that the assist controlled variable $I_{as}^*$ will be erroneously limited. The determination units 301 to 305 and 311 to 315 have, for example, the function as a low-pass filter that is a delay element.

The determination units 301 to 305 and 311 to 315 execute a filtering operation expressed by the following expression (A) or (B). Expression (A) is set on the basis of a concept that the phase of each limit is delayed on the basis of a phase delay caused by the phase compensator 300. Expression (B) is established on the basis of a concept that the phase of each limit is delayed on the basis of a phase delay caused by a delay element (filter element) other than the phase compensator 300.

$$Sfilt=\{(1+\alpha^*T1^*s)/(1+T1^*s)\}^*\{1/(1+T2^*s)\}^*S \quad\quad (A)$$

$$Sfilt=1/(1+T3^*s)^*S \quad\quad (B)$$

Here, Sfilt represents a signal (τfilt, dτfilt, θsfilt, ωsfilt, αsfilt) that has been subjected to the filtering operation, α represents a gain, T1, T2, and T3 represent time constants, s represents a variable of Laplace transform, and S represents a signal (τ, dτ, θs, ωs, αs) that has not been subjected to the filtering operation.

In the present embodiment, Expression (A) is used in the determination units 301, 311 that process the steering torque τ. This is because the phase delay of the steering torque t is caused by the phase compensator 300. Expression (B) is used in the determination units 302 to 305 and the determination units 312 to 315 that process the signals (dτ, θs, ωs, αs) other than the steering torque τ. This is because the phase delays of the other signals are caused by the delay elements (filter elements) other than the phase compensator 300. When the phases of the other signals are delayed by delay elements similar to the phase compensator 300, Expression (A) is used.

Figure 15:
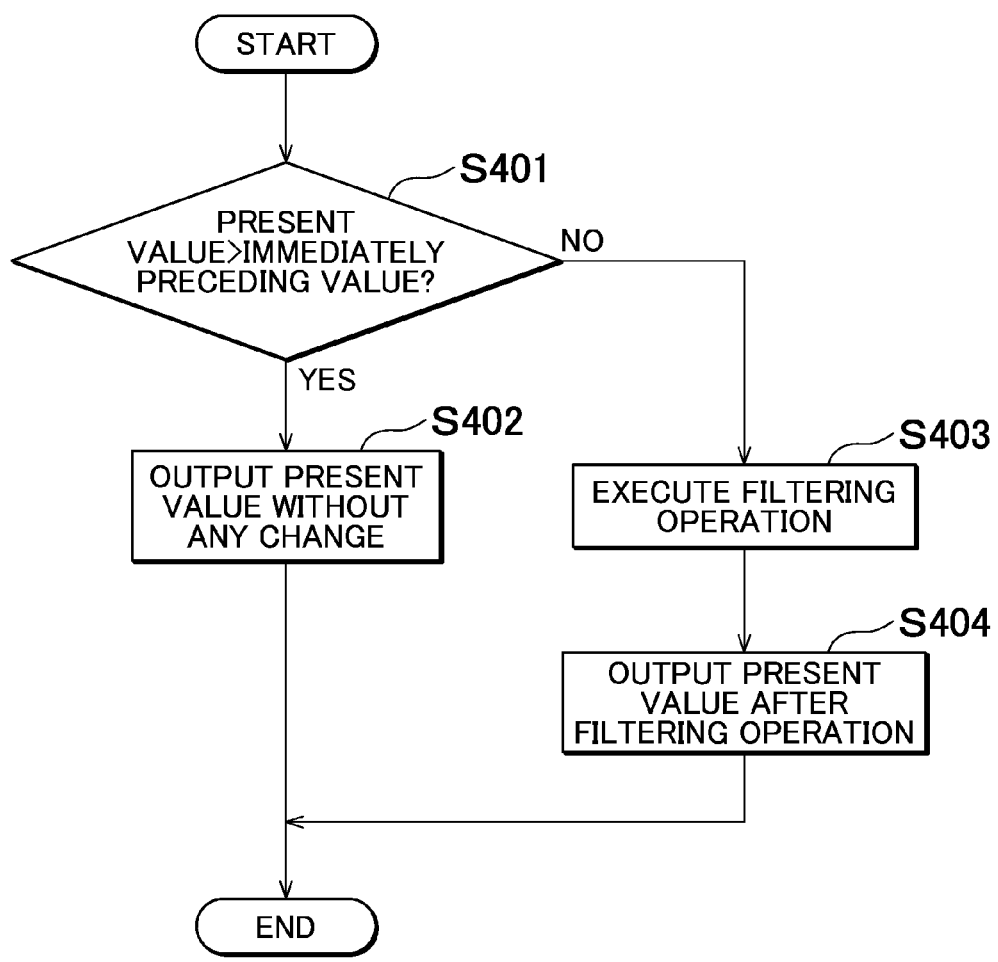
FIG. 15 is a flowchart illustrating a processing routine executed by a filter processing unit in the fourth embodiment.

The operation of the determination unit 301 will be described below as a representative example of the operations of the determination units 301 to 305 and 311 to 315. As illustrated in the flowchart in FIG. 15, the determination unit 301 compares the present value and the immediately preceding value of the steering torque τ detected by the torque sensor 53 with a prescribed sampling period (step S401). That is, the determination unit 301 determines in which of the two regions R1, R2 the limit (for example, the upper limit $I_{UL1}^*$) is present in the graph illustrated in FIG. 13. The immediately preceding value is temporarily stored in the memory of the microcomputer 42.

When it is determined that the present value is larger than the immediately preceding value (YES in step S401), the determination unit 301 outputs the present value without any change (step S402), and ends the processing routine. In this case, the steering torque-sensitive limiter 91 is supplied with the present steering torque τ without any change. The reason is as follows. That is, when the present value is larger than the immediately preceding value, there is a high probability that the limit is located in the region R1 exhibiting an increasing tendency in the graph in FIG. 13. Accordingly, because there is no possibility that the assist controlled variable $I_{as}^*$ will be erroneously limited, it is not necessary to delay the limit.

When it is determined that the present value is not larger than the immediately preceding value, that is, when the present value is equal to or less than the immediately preceding value (NO in step S401), the determination unit 301 executes the filtering operation on the present value (step S403). At this time, the determination unit 301 uses Expression (A). The reason is as follows. That is, when the present value is equal to or less than the immediately preceding value, there is a high probability that the limit is located in the region R2 exhibiting a decreasing tendency toward zero in the graph in FIG. 13. Accordingly, since there is a possibility that the assist controlled variable $I_{as}$* will be erroneously limited, it is necessary to delay the limit Therefore, the determination unit 301 outputs the present value that has been subjected to the filtering operation to the steering torque-sensitive limiter 91 (step S404), and then ends the processing routine. That is, the steering torque-sensitive limiter 91 is supplied with the present value of the steering torque τ that has been subjected to the filtering process.

In this case, as indicated by each arrow D2 in the graph in FIG. 13, the phase of the limit ($I_{UL1}$*) based on the steering torque t that has been subjected to the filtering process using Expression (A) is delayed, for example, by a phase φ2, with respect to the phase of the assist controlled variable $I_{as}$*. Accordingly, because the value of the assist controlled variable $I_{as}$* is smaller than the limit in the region R2, the normal value of the assist controlled variable $I_{as}$* is not erroneously limited.

The other determination units 302 to 305 and 312 to 315 execute processes similar to that executed by the determination unit 301. These processes are different from the process executed by the determination unit 301 only in that the signals to be processed are dτ, θs, ωs, αs and Expression (B) is used at the time of executing the filtering operation.

The present embodiment may be modified as follows. As indicated by two-dot chained lines in FIG. 14, the determination units 301 to 305 and 311 to 315 may be installed on the output paths through which the limits ($I_{UL1}$* to $I_{UL5}$* and $I_{LL1}$* to $I_{LL5}$*) are output from the respective sensitive limiters 91 to 95 and 101 to 105 instead of being installed on the input paths through which the signals (τ, dτ, θs, ωs, αs) are input into the respective sensitive limiters 91 to 95 and 101 to 105. In this case, the determination units 301 to 305 and 311 to 315 delay the phases of the limits generated by the respective sensitive limiters 91 to 95 and 101 to 105.

In the present embodiment, the phases of the signals are delayed through the filtering processes by the determination units 301 to 305 and 311 to 315. However, the following configuration may be employed. That is, the upper and lower limits computing unit 72 maintains the limits for a prescribed delay time after generating the limits ($I_{UL1}$* to $I_{UL5}$*), and supplies the limits to the adders 96, 106 after the delay time elapses. With this configuration as well, it is possible to delay the phases of the limits. In this case, the determination units 301 to 305 and 311 to 315 do not need to execute the filtering process and have only to determine whether the delay is necessary. In addition, the signals (τ, dτ, θs, ωs, αs) instead of the limits may be maintained for a prescribed delay time. With this configuration as well, it is also possible to delay the phases of the limits.

The degree of phase delay of the limits may be changed as needed. For example, in the above-described example, the phases of the limits are delayed by the phase φ2 with respect to the phase of the assist controlled variable $I_{as}$*. If the phases of the limits that have been subjected to the delay are advanced with respect to the phase of the assist controlled variable $I_{as}$* instead of being delayed with respect to phase of the assist controlled variable $I_{as}$*, the result is acceptable. That is, when the phase deviations between the limits and the assist controlled variable $I_{as}$* are decreased even if only slightly by delaying the phases of the limits even by a small amount, it is possible to obtain an effect of suppressing erroneous limitation.

The present embodiment is applicable not only to the first embodiment but also to the second or third embodiment. When the present embodiment is applied to the third embodiment, the determination units 301 to 305 (the determination units 311 to 315) are installed on the input paths or the output paths through which the signals are input into or output from the sensitive limiters (201 to 205) illustrated in FIG. 11.

According to the present embodiment, the following advantageous effect of 6) are obtained.

6) The microcomputer 42 determines whether the phases of the limits need to be delayed through the comparison between the present values and the immediately preceding values of the signals (τ, dτ, θs, ωs, αs). When the phase delay occurs in the signals generated by the assist controller 71 and the phase delay does not occur in the limits generated by the upper and lower limits computing unit 72, if the present values are smaller than the immediately preceding values, there is a possibility that the normal assist controlled variable $I_{as}$* will be erroneously limited. When it is determined that the phases of the limits need to be delayed, the microcomputer 42 delays phases of the limits by executing the filtering operation expressed by Expression (A) or Expression (B) on the signals. By delaying the phases of the limits, the possibility that the normal assist controlled variable $I_{as}$* is erroneously limited is reduced. The reliability of the electric power steering system 10 is improved.

Next, an electric power steering system according to a fifth embodiment of the invention will be described below. In the present embodiment, basically the same configuration as that in the first embodiment illustrated in FIG. 1 to FIG. 9 is employed. The present embodiment is applicable to all the first to fourth embodiments.

Figure 16:
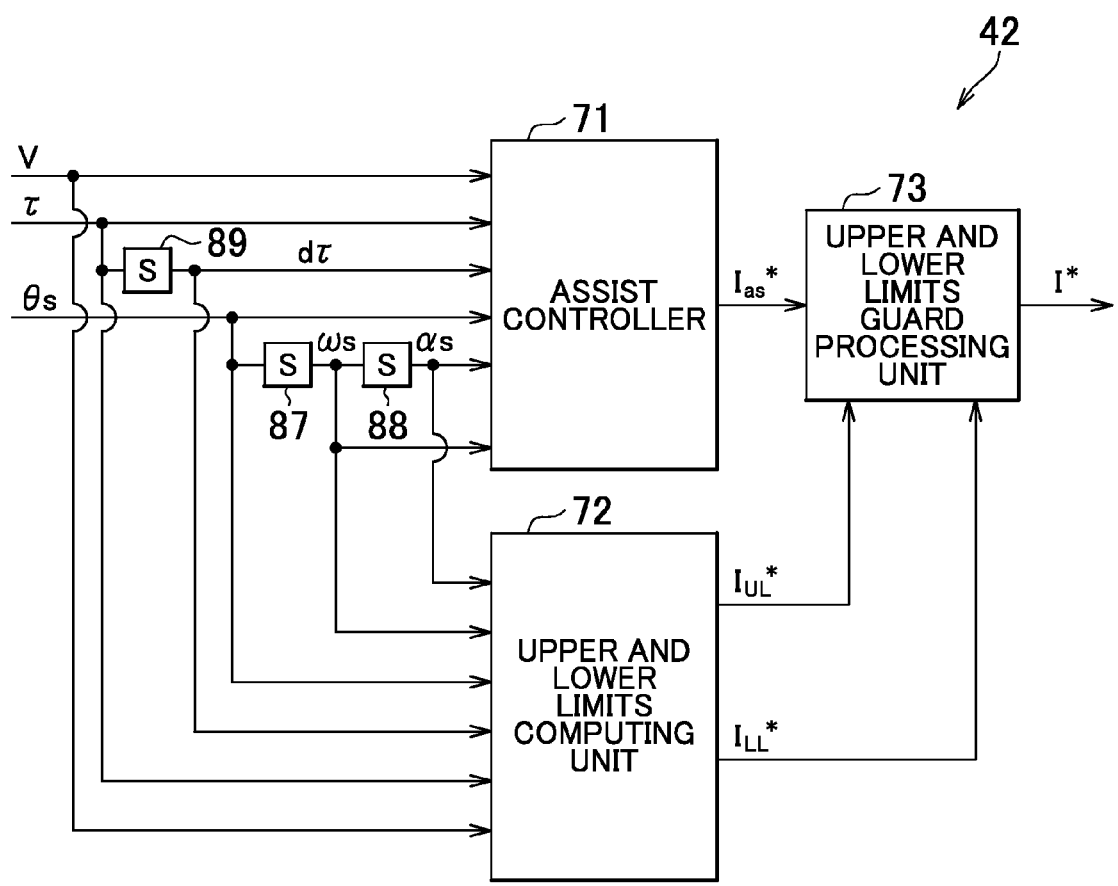
FIG. 16 is a control block diagram of an electric power steering system according to a fifth embodiment of the invention.

As illustrated in FIG. 16, the upper and lower limits computing unit 72 also receives the vehicle speed V. The upper and lower limits computing unit 72, more specifically, the upper limit computing unit 90 and the lower limit computing unit 100 illustrated in FIG. 4, have sixth to tenth limit maps M6 to M10 instead of the first to fifth limit maps M1 to M5. The upper limit computing unit 90 and the lower limit computing unit 100 compute the upper limits $I_{UL1}$* to $I_{UL5}$* and the lower limits $I_{LL1}$* to $I_{LL5}$* using the sixth to tenth limit maps M6 to M10. The sixth to tenth limit maps M6 to M10 are different from the first to fifth limit maps M1 to M5, in that the limits (the upper limits $I_{UL1}$* to $I_{UL5}$* and the lower limits $I_{LL1}$* to $I_{LL5}$*) of the assist controlled variable $I_{as}$* are set on the basis of the vehicle speed V.

As illustrated in FIG. 17, the sixth limit map M6 defines the limits (the upper limit $I_{UL1}$* and the lower limit $I_{LL1}$*) of the assist controlled variable $I_{as}$* with respect to the steering torque τ, on the basis of the vehicle speed V. When the steering torque τ is a positive value, the upper limit $I_{UL1}$* increases in the positive direction with an increase in the steering torque τ and with a decrease in the vehicle speed V, and is maintained at a constant positive value after the steering torque τ reaches a prescribed value. When the steering torque τ is a positive value, the lower limit $I_{LL1}$* of the assist controlled variable $I_{as}$* is maintained at zero. On the other hand, when the steering torque τ is a negative value, the upper limit $I_{UL4}$* of the assist controlled variable $I_{as}$* is maintained at zero. When the steering torque τ is a negative value, the lower limit $I_{LL1}$* of the assist controlled variable $I_{as}$* increases in the negative direction with an increase in the absolute value of the steering torque τ and with a decrease in the vehicle speed V, and is maintained at a constant negative value after the steering torque τ reaches a prescribed value.

Figure 18:
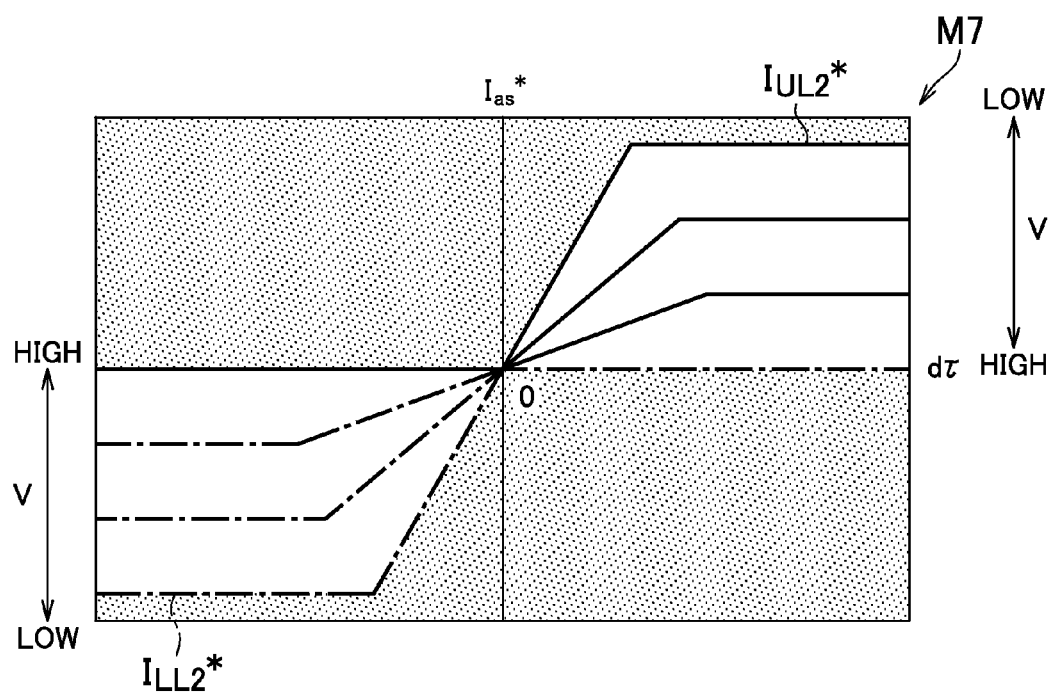
FIG. 18 is a map illustrating the relationship among the steering torque derivative value, the vehicle speed and the limits in the fifth embodiment.

As illustrated in FIG. 18, the seventh limit map M7 defines the limits (the upper limit $I_{UL2}$* and the lower limit $I_{LL2*}$) of the assist controlled variable $I_{as}$* with respect to the steering torque derivative value dτ, on the basis of the vehicle speed V. When the steering torque derivative value dτ is a positive value, the upper limit $I_{UL2}$* increases in the positive direction with an increase in the steering torque derivative value dτ and with a decrease in the vehicle speed V, and is maintained at a constant positive value after the steering torque derivative value dτ reaches a prescribed value. When the steering torque derivative value dτ is a positive value, the lower limit $I_{LL2}$* of the assist controlled variable $I_{as}$* is maintained at zero. On the other hand, when the steering torque derivative value dτ is a negative value, the upper limit $I_{UL2}$* of the assist controlled variable $I_{as}$* is maintained at zero. When the steering torque derivative value dτ is a negative value, the lower limit $I_{LL2}$* of the assist controlled variable $I_{as}$* increases in the negative direction with an increase in the absolute value of the steering torque derivative value dτ and with a decrease in the vehicle speed V, and is maintained at a constant negative value after the steering torque derivative value dτ reaches a prescribed value.

As illustrated in FIG. 19, the eighth limit map M8 defines the limits (the upper limit $I_{UL3}$* and the lower limit $I_{LL3}$*) of the assist controlled variable $I_{as}$* with respect to the steering angle θs, on the basis of the vehicle speed V. When the steering angle θs is a positive value, the upper limit $I_{UL3}$* is maintained at zero. When the steering angle θs is a positive value, the lower limit $I_{LL3}$* increases in the negative direction with an increase in the steering angle θs and with an increase in the vehicle speed V. On the other hand, when the steering angle θs is a negative value, the lower limit $I_{LL3}$* of the assist controlled variable $I_{as}$* is maintained at zero. When the steering angle θs is a negative value, the upper limit $I_{UL3}$* of the assist controlled variable $I_{as}$* increases in the positive direction with an increase in the absolute value of the steering angle θs and with an increase in the vehicle speed V.

As illustrated in FIG. 20, the ninth limit map M9 defines the limits (the upper limit $I_{UL4}$* and the lower limit $I_{LL4}$*) of the assist controlled variable $I_{as}$* with respect to the steering angular velocity ωs, on the basis of the vehicle speed V. When the steering angular velocity ωs is a positive value, the upper limit $I_{UL4}$* is maintained at zero. When the steering angular velocity ωs is a positive value, the lower limit $I_{LL4}$* increases in the negative direction with an increase in the steering angular velocity ωs and with an increase in the vehicle speed V, and is maintained at a constant negative value after the steering angular velocity ωs reaches a prescribed value. On the other hand, when the steering angular velocity ωs is a negative value, the lower limit $I_{LL4}$* of the assist controlled variable $I_{as}$* is maintained at zero. When the steering angular velocity ωs is a negative value, the upper limit $I_{UL4}$* of the assist controlled variable $I_{as}$* increases in the positive direction with an increase in the absolute value of the steering angular velocity ωs and with an increase in the vehicle speed V, and is maintained at a constant positive value after the steering angular velocity ωs reaches a prescribed value.

Figure 21:
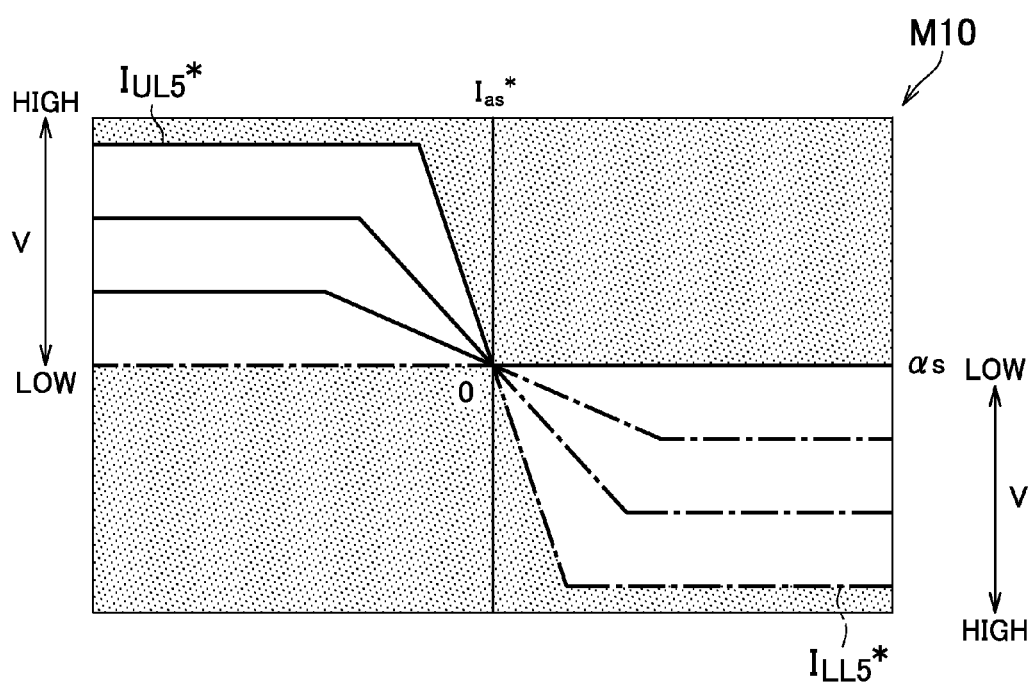
FIG. 21 is a map illustrating the steering angular acceleration, the vehicle speed and the limits in the fifth embodiment.

As illustrated in FIG. 21, the tenth limit map M10 defines the limits (the upper limit $I_{UL5}$* and the lower limit $I_{LL5}$*) of the assist controlled variable $I_{as}$* with respect to the steering angular acceleration αs, on the basis of the vehicle speed V. When the steering angular acceleration αs is a positive value, the upper limit $I_{UL5}$* is maintained at zero. When the steering angular acceleration αs is a positive value, the lower limit $I_{LL5}$* increases in the negative direction with an increase in the steering angular acceleration αs and with an increase in the vehicle speed V, and is maintained at a constant negative value after the steering angular acceleration αs reaches a prescribed value. On the other hand, when the steering angular acceleration αs is a negative value, the lower limit $I_{LL5}$* of the assist controlled variable $I_{as}$* is maintained at zero. When the steering angular acceleration αs is a negative value, the upper limit $I_{UL5}$* of the assist controlled variable $I_{as}$* increases in the positive direction with an increase in the absolute value of the steering angular acceleration αs and with an increase in the vehicle speed V, and is maintained at a constant positive value after the steering angular acceleration αs reaches a prescribed value.

The following operations are achieved by using the sixth to tenth limit maps M6 to M10 in which the vehicle speed V is taken into account. The assist controlled variable $I_{as}$* that should be limited varies depending on the vehicle speed V. In this regard, in the first to fifth limit maps M1 to M5, the vehicle speed V is not taken into account. In the first to fifth limit maps M1 to M5, the limits (the upper limit and the lower limit) are set, for example, on the basis of the largest assist controlled variable $I_{as}$* out of the assist control amounts $I_{as}$* that may be obtained in the entire range of the vehicle speed V. Accordingly, the abnormal assist controlled variable $I_{as}$* is not always limited by the optimal limits.

In this regard, according to the sixth limit map M6, the following operations are obtained. That is, as indicated by a point P1 in FIG. 6, when the steering torque τ is, for example, a positive steering torque τ1 and the vehicle speed V is higher than a vehicle speed V1 and lower than a vehicle speed V2, the upper limit $I_{UL1}$* is set by a characteristic line L2. The upper limit $I_{UL1}$* set by the characteristic line L2 is smaller than the upper limit $I_{UL1}$* set by a characteristic line L1 corresponding to the upper limit of the first limit map M1. The assist controlled variable $I_{as}$* is limited to the upper limit $I_{UL1}$* set by the characteristic line L2. The lower limit $I_{LL1}$* also varies depending on the vehicle speed V, like the upper limit $I_{UL1}$*. By taking into account the vehicle speed V in this way, the accuracy of the limits (the upper limit $I_{UL1}$* and the lower limit $I_{LL1}$*) with respect to the steering torque τ is improved. Accordingly, the assist controlled variable $I_{as}$* that is permitted in the first limit map M1 and that should be limited is detected and limited more promptly. As a result, it is possible to more appropriately execute the limiting process on the assist controlled variable $I_{as}$* on the basis of the steering torque τ.

The same is true on the seventh to tenth limit maps M7 to M10. That is, it is possible to more appropriately execute the limiting processes on the assist controlled variable $I_{as}$* based on the steering torque derivative value dτ, the steering angle θs, the steering angular velocity ωs, and the steering angular acceleration αs, on the basis of the vehicle speed V.

According to the present embodiment, the following advantageous effect of 7) can be obtained.

7) By setting the limits (the upper limits $I_{UL1}$* to $I_{UL5}$* and the lower limits $I_{LL1}$* to $I_{LL5}$*) of the assist controlled variable $I_{as}$* on the basis of the vehicle speed V, it is possible to improve the accuracy of the limits. Accordingly, it is possible to execute a more appropriate limiting process. For example, the assist controlled variable $I_{as}$* that is permitted in the first to fifth limit maps M1 to M5, in which the vehicle speed V is not taken into account, and that should be limited can be detected and limited more promptly.

Next, an electric power steering system according to a sixth embodiment of the invention will be described below. The present embodiment is applicable to all of the first to fifth embodiments.

In the present embodiment as well as in the second embodiment, the gradual decrease process illustrated in FIG. 10 is executed. That is, the microcomputer 42 gradually decreases the upper limit $I_{UL}{}^*$ or the absolute value of the lower limit $I_{LL}{}^*$ toward zero when the state in which the value of the assist controlled variable $I_{as}{}^*$ is limited by the upper limit $I_{UL}{}^*$ or the lower limit $I_{LL}{}^*$ has continued for the prescribed period $\Delta T$. When the upper limit $I_{UL}{}^*$ or the lower limit $I_{LL}{}^*$ reaches zero (for example, at time $I_{L2}$), the value of the assist controlled variable $I_{as}{}^*$ becomes zero and thus application of an assist force to the steering system is stopped. Accordingly, it is possible to inhibit unintended steering behavior when the abnormal assist controlled variable $I_{as}{}^*$ is generated. However, a so called manual steering system state in which the assist force is not applied to the steering system occurs and thus there is a possibility that the steering feel will deteriorate. Therefore, in the present embodiment, the following configuration is employed.

Figure 22:
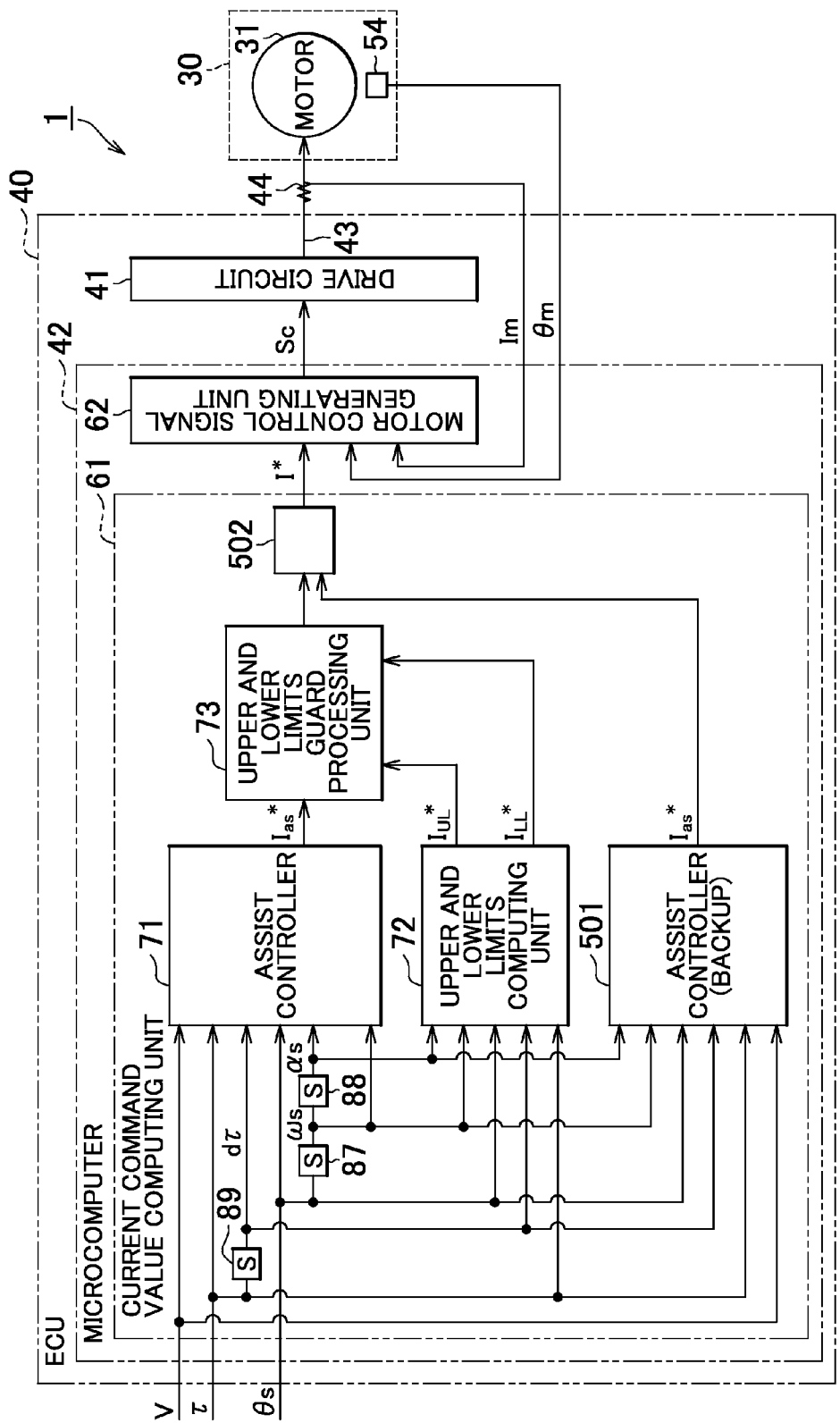
FIG. 22 is a control block diagram of an electric power steering system according to a sixth embodiment of the invention.

As illustrated in FIG. 22, the microcomputer 42 includes a sub-assist controller 501 in addition to the main assist controller 71. The sub-assist controller 501 computes the assist controlled variable $I_{as}{}^*$ on the basis of the vehicle speed V, the steering torque $\tau$, the steering angle $\theta s$, the steering torque derivative value $\dot{\tau}$, the steering angular velocity $\omega s$, and the steering angular acceleration $\alpha s$, like the main assist controller 71.

The microcomputer 42 includes a switching unit 502. The switching unit 502 receives the assist controlled variable $I_{as}{}^*$ generated by the main assist controller 71 (more specifically, the assist controlled variable $I_{as}{}^*$ that has been processed by the upper and lower limits guard processing unit 73) and the assist controlled variable $I_{as}{}^*$ generated by the sub-assist controller 501. The switching unit 502 supplies one of the two assist control amounts $I_{as}{}^*$, as a final current command value I*, to the motor control signal generating unit 62.

In a normal state, the switching unit 502 uses the assist controlled variable $I_{as}{}^*$ generated by the main assist controller 71. The normal state means a state where the limiting process is not executed by the upper and lower limits guard processing unit 73 and a state where the time that has elapsed after the limiting process is started is shorter than the prescribed period $\Delta T$.

In an abnormal state, the switching unit 502 uses the assist controlled variable $I_{as}{}^*$ generated by the sub-assist controller 501 instead of the assist controlled variable $I_{as}{}^*$ generated by the main assist controller 71. The abnormal state means a state where the limiting process on the assist controlled variable $I_{as}{}^*$ generated by the main assist controller 71 has been continuously executed for the prescribed period $\Delta T$, as illustrated in the graph in FIG. 10. That is, at the timing (time TL1) at which the gradual decrease process of gradually decreasing the limits (the upper limit $I_{UL}{}^*$ or the lower limit $I_{LL}{}^*$) toward zero is started, the assist controlled variable $I_{as}{}^*$ to be used is switched from the assist controlled variable $I_{as}{}^*$ generated by the main assist controller 71 to the assist controlled variable $I_{as}{}^*$ generated by the sub-assist controller 501.

By using the normal assist controlled variable $I_{as}{}^*$ generated by the sub-assist controller 501, an appropriate assist force is continuously applied to the steering system.

The present embodiment may be modified as follows. The microcomputer 42 may stop execution of the gradual decrease process when the value of the assist controlled variable $I_{as}{}^*$ is returned to a value in the normal range between the upper limit $I_{UL}{}^*$ and the lower limit $I_{LL}{}^*$, inclusive, in the course of executing the gradual decrease process (reducing process) on the limits. At this time, the microcomputer 42 (more specifically, the switching unit 502) may use the assist controlled variable $I_{as}{}^*$ generated by the main assist controller 71 again instead of the assist controlled variable $I_{as}{}^*$ generated by the sub-assist controller 501 that serves as a backup assist controller.

As described above, the sub-assist controller 501 may have the same function as that of the main assist controller 71, or may have a function simpler than that of the main assist controller 71. When the function of the sub-assist controller 501 is simpler than that of the main assist controller 71, the basic assist controlled variable $I_1{}^*$ may be computed on the basis of the vehicle speed V and the steering torque $\tau$ and the basic assist controlled variable $I_1{}^*$ may be used as the current command value I* used for simple backup assist control. Various compensation controls executed by the compensation controller 82 need not be executed, or only some compensation controls may be executed. The signals input into the sub-assist controller 501 vary depending on the compensation control to be executed.

The timing at which the assist controlled variable $I_{as}{}^*$ to be used is switched from the assist controlled variable $I_{as}{}^*$ generated by the main assist controller 71 to the assist controlled variable $I_{as}{}^*$ generated by the sub-assist controller 501 may be changed as needed. As illustrated in the graph in FIG. 10, the assist controlled variable $I_{as}{}^*$ to be used may be switched at the timing (time $T_{L0}$) at which the limiting process on the assist controlled variable $I_{as}{}^*$ generated by the main assist controller 71 is started instead of the timing (time $T_{L1}$) at which the gradual decrease process on the limit is started.

According to the present embodiment, the following advantageous effect of 8) is obtained.

8) When the assist controlled variable $I_{as}{}^*$ generated by the main assist controller 71 is abnormal, the assist controlled variable $I_{as}{}^*$ generated by the sub-assist controller 501, which serves as the backup assist controlled, is used. Accordingly, even when the assist controlled variable $I_{as}{}^*$ generated by the main assist controller 71 is abnormal, an assist force is continuously applied to the steering system by using the assist controlled variable $I_{as}{}^*$ generated by the sub-assist controller 501. Because a change to the so called manual steering system state is avoided, the steering feel is appropriately maintained.

An electric power steering system according to a seventh embodiment of the invention will be described below. In the present embodiment, basically the same configuration as that in the sixth embodiment illustrated in FIG. 22 is employed.

Figure 23:
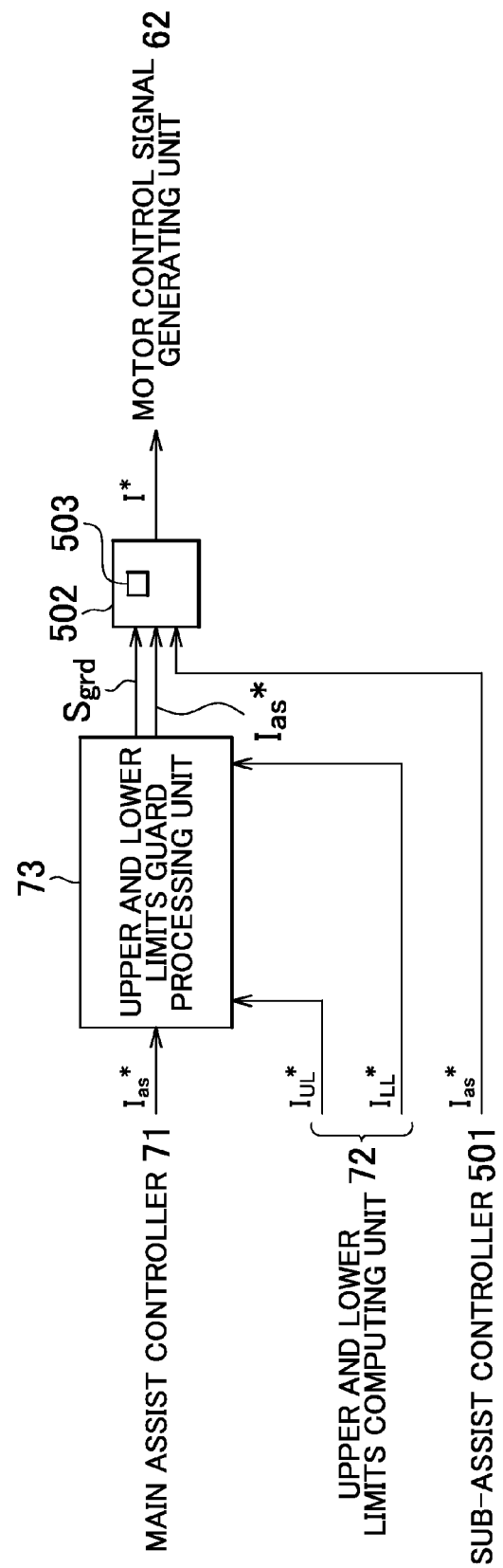
FIG. 23 is a control block diagram illustrating main portions of a current command value computing unit in a seventh embodiment of the invention.

As illustrated in FIG. 23, the upper and lower limits guard processing unit 73 generates a limit state signal $S_{grd}$ indicating whether the assist controlled variable $I_{as}{}^*$ generated by the main assist controller 71 (hereinafter, referred to as "main assist controlled variable $I_{as}{}^*$") is limited. The upper and lower limits guard processing unit 73 outputs the main assist controlled variable $I_{as}{}^*$ (assist controlled variable $I_{as}{}^*$ before or after being limited) and the limit state signal $S_{grd}$ to the switching unit 502.

The switching unit 502 includes an abnormality-determining counter 503. The switching unit 502 determines whether the main assist controlled variable $I_{as}{}^*$ is limited on the basis of the limit state signal $S_{grd}$ generated by the upper and lower limits guard processing unit 73. The switching unit 502 increases the count value of the counter 503 each time it is determined that the main assist controlled variable $I_{as}{}^*$ is limited. The switching unit 502 determines which of the main assist controlled variable $I_{as}{}^*$ and the assist controlled variable $I_{as}{}^*$ generated by the sub-assist controller 501 (hereinafter, referred to as a sub-assist controller) should be used on the basis of the count value of the counter 503.

Next, the processing routine executed by the upper and lower limits guard processing unit 73 will be described below in detail. As illustrated in the flowchart in FIG. 24, the upper and lower limits guard processing unit 73 determines whether the assist controlled variable $I_{as}^*$ generated by the main assist controller 71 is larger than the upper limit $I_{UL}^*$ (step S601). When it is determined that the assist controlled variable $I_{as}^*$ generated by the main assist controller 71 is larger than the upper limit $I_{UL}^*$ (YES in step S601), the upper and lower limits guard processing unit 73 updates (limits) the assist controlled variable $I_{as}^*$ generated by the main assist controller 71 to the upper limit $I_{UL}^*$.

Then, the upper and lower limits guard processing unit 73 generates the limit state signal $S_{grd}$ (step S603). The limit state signal $S_{grd}$ is a signal indicating that the main assist controlled variable $I_{as}^*$ is limited.

Subsequently, the upper and lower limits guard processing unit 73 outputs the assist controlled variable $I_{as}^*$ updated (limited) to the upper limit $I_{UL}^*$ in step S602 and the limit state signal $S_{grd}$ generated in step S603 to the switching unit 502 (step S604), and then ends the processing routine.

When it is determined in step S601 that the main assist controlled variable $I_{as}^*$ is not larger than the upper limit $I_{UL}^*$ (NO in step S601), the upper and lower limits guard processing unit 73 determines whether the assist controlled variable $I_{as}^*$ is smaller than the lower limit $I_{LL}^*$ (step S605).

When it is determined that the main assist controlled variable $I_{as}^*$ is smaller than the lower limit $I_{LL}^*$ (YES in step S605), the upper and lower limits guard processing unit 73 updates (limits) the assist controlled variable $I_{as}^*$ to the lower limit $I_{LL}^*$ (step S606), and executes the process in step S603.

When it is determined in step S605 that the main assist controlled variable $I_{as}^*$ is not smaller than the lower limit $I_{LL}^*$ (NO in step S605), the upper and lower limits guard processing unit 73 generates the limit state signal $S_{grd}$ (step S607), and executes the process in step S604. The limit state signal $S_{grd}$ is a signal indicating that the main assist controlled variable $I_{as}^*$ is not limited.

Next, the processing routine executed by the switching unit 502 will be described below in detail. As illustrated in the flowchart in FIG. 25, the switching unit 502 determines whether the main assist controlled variable $I_{as}^*$ is limited on the basis of the limit state signal $S_{grd}$ generated by the upper and lower limits guard processing unit 73 (step S701).

When it is determined that the assist controlled variable $I_{as}^*$ is limited (YES in step S701), the switching unit 502 adds a certain value Na to the count value N of the counter 503 (step S702).

Then, the switching unit 502 determines whether the count value N is equal to or greater than an abnormality-determining threshold Nth (step S703). This determination corresponds to the determination as to whether the state in which the assist controlled variable $I_{as}^*$ is limited has continued for the prescribed period $\Delta T$ in the sixth embodiment.

When it is determined that the count value N is equal to or greater than the abnormality-determining threshold Nth (YES in step S703), the switching unit 502 continues to assist the steering using the sub-assist controlled variable $I_{as}^*$ (step S704), and then ends the processing routine. That is, the switching unit 502 supplies the sub-assist controlled variable $I_{as}^*$, instead of the main assist controlled variable $I_{as}^*$, to the motor control signal generating unit 62, as the final current command value $I^*$.

When it is determined in step S703 that the count value N is neither equal to nor greater than the abnormality-determining threshold Nth (NO in step S703), the switching unit 502 continues to assist the steering using the main assist controlled variable $I_{as}^*$ (more specifically, the assist controlled variable $I_{as}^*$ that has been processed by the upper and lower limits guard processing unit 73) (step S705), and then ends the processing routine.

When it is determined in step S701 that the main assist controlled variable $I_{as}^*$ is not limited (NO in step S701), the switching unit 502 subtracts a certain value Ns from the count value N of the counter 503 (step S706). The certain value Ns for decreasing the count value N is set smaller than the certain value Na for increasing the count value N.

Then, the switching unit 502 continues to assist the steering using the main assist controlled variable $I_{as}^*$ (more specifically, the assist controlled variable $I_{as}^*$ that has been processed by the upper and lower limits guard processing unit 73) (step S707), and then ends the processing routine.

Figure 25:
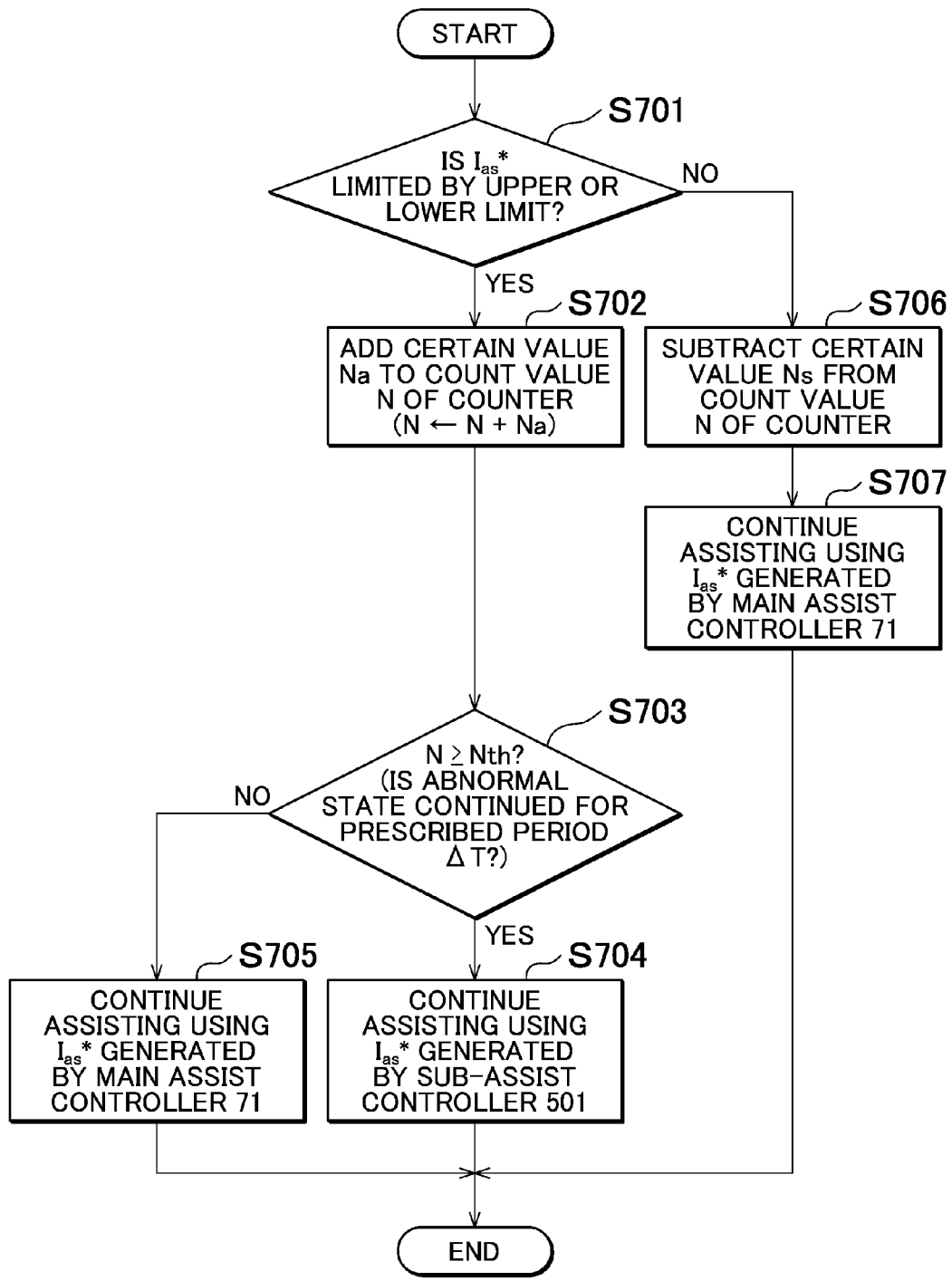
FIG. 25 is a flowchart illustrating a processing routine executed by a switching unit in the seventh embodiment.

A configuration obtained by omitting the processes in steps S706, S707 from the flowchart in FIG. 25 may be employed. In this case, the switching unit 502 ends the processing routine when it is determined that the main assist controlled variable $I_{as}^*$ is not limited (NO in step S701).

According to the present embodiment, the following advantageous effects of 9) and 10) are obtained.

9) When the abnormal state where the main assist controlled variable $I_{as}^*$ is limited has continued for the prescribed period, the assist controlled variable $I_{as}^*$ to be used is switched from the main assist controlled variable $I_{as}^*$ to the sub-assist controlled variable $I_{as}^*$, as a prescribed failsafe operation. Accordingly, it is possible to a higher degree of safety.

10) The count value N is increased by the certain value Na when the main assist controlled variable $I_{as}^*$ is limited, whereas the count value N is decreased by the certain value Ns (<Na) when the assist controlled variable $I_{as}^*$ is not limited. That is, a larger weight is assigned to the state where the main assist controlled variable $I_{as}^*$ is limited. Accordingly, it is possible to obtain a higher degree of safety.

An electric power steering system according to an eighth embodiment of the invention will be described below. In the present embodiment, basically the same configuration as that in the seventh embodiment illustrated in FIG. 23 is employed.

In the seventh embodiment, an abnormality of the main assist controlled variable $I_{as}^*$ is determined simply on the basis of the count value (integrated time) of the counter 503. When the count value N reaches the abnormality-determining threshold Nth, that is, when an abnormality occurs, assisting the steering is continued using the sub-assist controlled variable $I_{as}^*$. In this case, there are the following possibilities.

That is, during a period from when the main assist controlled variable $I_{as}^*$ is limited until when the count value N reaches the abnormality-determining threshold Nth (abnormality determination period), there is a possibility that the steering feel will be lower than that in the normal state. This is because the assist controlled variable $I_{as}^*$ of which the upper limit or the lower limit is limited is used instead of the appropriate main assist controlled variable $I_{as}^*$.

Figure 26:
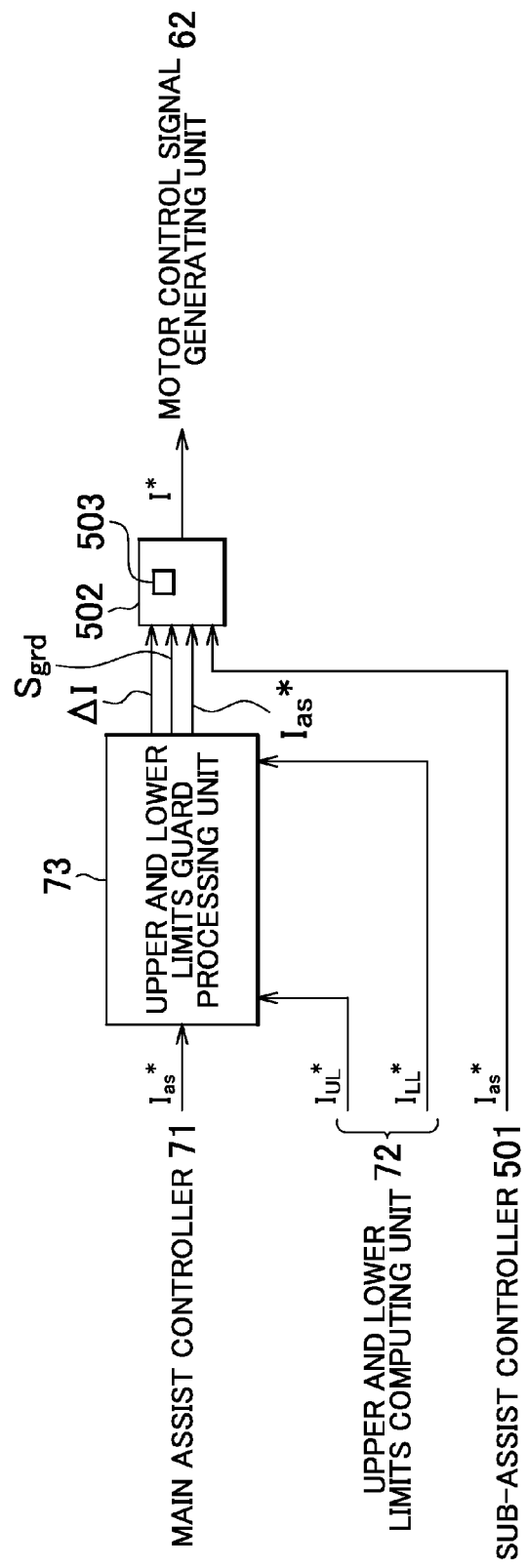
FIG. 26 is a control block diagram illustrating main portions of a current command value computing unit in an eighth embodiment of the invention.

Therefore, in the present embodiment, the following configuration is employed. As illustrated in FIG. 26, the upper and lower limits guard processing unit 73 computes a deviation $\Delta I$ between the main assist controlled variable $I_{as}^*$ before being limited and the limit (the upper limit $I_{UL}^*$ or the lower limit $I_{LL}^*$) in addition to generating the limit state signal $S_{grd}$. The deviation $\Delta I$ is expressed by the following expression (C).

$$\Delta I = I_{as}^* - \text{limit}(I_{UL}^* \text{ or } I_{LL}^*) \tag{C}$$

The upper and lower limits guard processing unit 73 outputs the main assist controlled variable $I_{as}^*$ (more specifically, the assist controlled variable $I_{as}*$ that has been processed by the upper and lower limits guard processing unit 73), the limit state signal $S_{grd}$, and the deviation ΔI to the switching unit 502.

The switching unit 502 changes an increment Nu of the counter 503 on the basis of the absolute value of the deviation ΔI. The switching unit 502 computes the increment Nu of the counter 503 using an increment setting map M11 illustrated in FIG. 27. The increment setting map M11 is stored in a memory (not illustrated) of the microcomputer 42. The increment setting map M11 is set on the basis of a concept that the switching from the main assist controlled variable $I_{as}*$ to the sub-assist controlled variable $I_{as}*$ is appropriately executed on the basis of the absolute value of the deviation ΔI. That is, as the absolute value of the deviation ΔI increases, the degree of abnormality (erroneous output energy) of the main assist controlled variable $I_{as}*$ increases. Accordingly, it is preferable that the assist controlled variable to be used be more rapidly switched.

Figure 27:
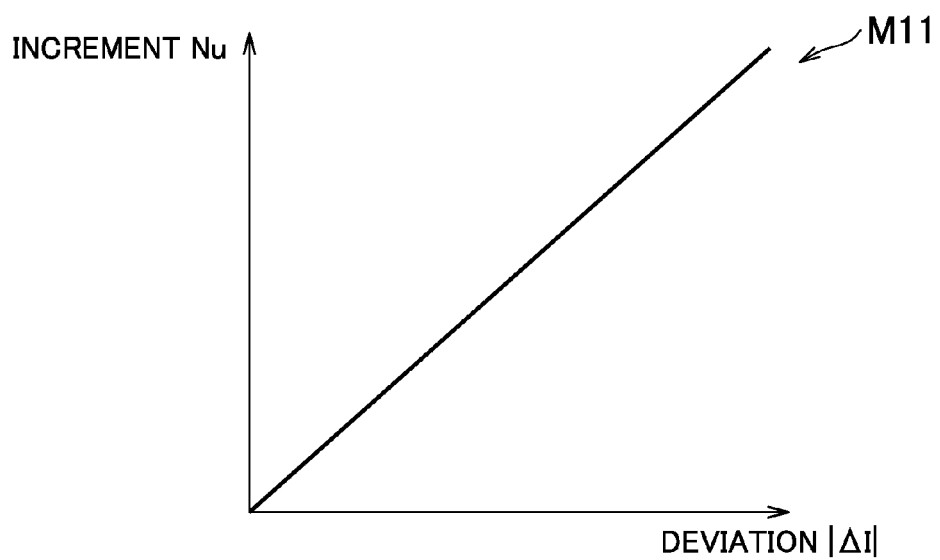
FIG. 27 is a map illustrating the relationship between the counter increment and the deviation in the eighth embodiment.

As illustrated in FIG. 27, the increment setting map M11 is a map in which the abscissa axis represents the absolute value of the deviation ΔI and the ordinate axis represents the increment Nu of the counter 503. In the present embodiment, the absolute value of the deviation ΔI and the increment Nu have a proportional relationship. That is, as the absolute value of the deviation ΔI increases, the value of the increment Nu increases.

Figure 28:
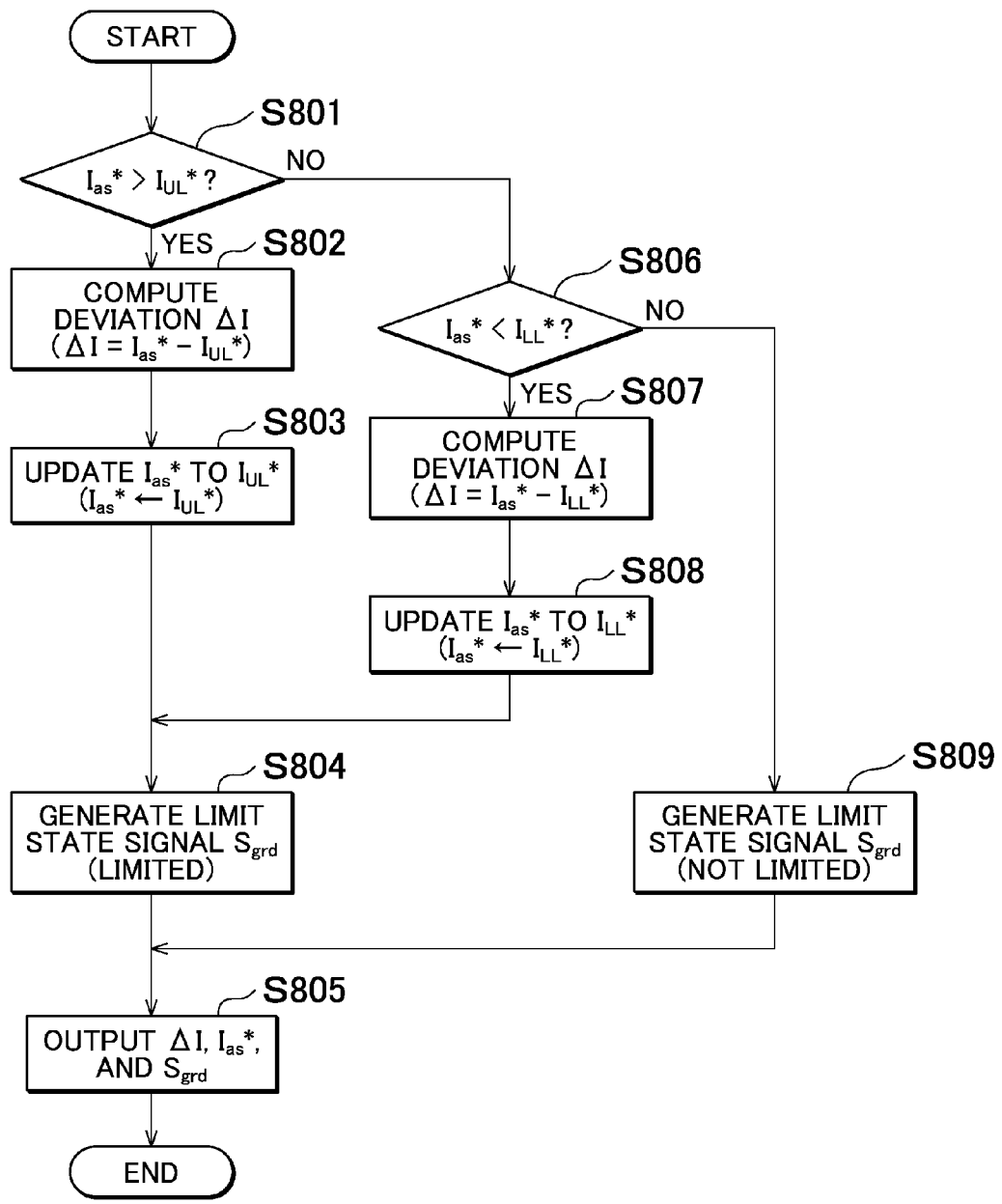
FIG. 28 is a flowchart illustrating a control routine executed by an upper and lower limit guard processing unit in the eighth embodiment.

Next, the processing routine executed by the upper and lower limits guard processing unit 73 will be described below in detail. As illustrated in the flowchart in FIG. 28, the upper and lower limits guard processing unit 73 determines whether the main assist controlled variable $I_{as}*$ is larger than the upper limit $I_{UL}*$ (step S801). When it is determined that the main assist controlled variable $I_{as}*$ is larger than the upper limit $I_{UL}*$ (YES in step S801), the upper and lower limits guard processing unit 73 computes the deviation ΔI on the basis of Expression (C) (step S802). Because the limit is the upper limit $I_{UL}*$ in this case, the upper limit $I_{UL}*$ is subtracted from the value of the main assist controlled variable $I_{as}*$.

Next, the upper and lower limits guard processing unit 73 updates (limits) the main assist controlled variable $I_{as}*$ to the upper limit $I_{UL}*$. Then, the upper and lower limits guard processing unit 73 generates the limit state signal $S_{grd}$ (step S804). The limit state signal $S_{grd}$ in this case is a signal indicating that the main assist controlled variable $I_{as}*$ is limited.

The upper and lower limits guard processing unit 73 outputs the deviation ΔI generated in step S802, the main assist controlled variable $I_{as}*$ updated (limited) to the upper limit $I_{UL}*$ in step S803, and the limit state signal $S_{grd}$ generated in step S804 to the switching unit 502 (step S805), and then ends the processing routine.

When it is determined in step S801 that the main assist controlled variable $I_{as}*$ is not larger than the upper limit $I_{UL}*$ (NO in step S801), the upper and lower limits guard processing unit 73 determines whether the assist controlled variable $I_{as}*$ is smaller than the lower limit $I_{LL}*$ (step S806).

When it is determined that the main assist controlled variable $I_{as}*$ is smaller than the lower limit $I_{LL}*$ (YES in step S806), the upper and lower limits guard processing unit 73 computes the deviation ΔI on the basis of Expression (C) (step S807). Because the limit is the lower limit $I_{LL}*$ in this case, the lower limit $I_{LL}*$ is subtracted from the value of the main assist controlled variable $I_{as}*$.

Next, the upper and lower limits guard processing unit 73 updates (limits) the main assist controlled variable $I_{as}*$ to the lower limit $I_{LL}*$, and then executes the process in step S804.

When it is determined in step S806 that the main assist controlled variable $I_{as}*$ is not smaller than the lower limit $I_{LL}*$ (NO in step S806), the upper and lower limits guard processing unit 73 generates the limit state signal $S_{grd}$ (step S809), and then executes the process in step S805. The limit state signal $S_{grd}$ in this case is a signal indicating that the main assist controlled variable $I_{as}*$ is not limited.

The processing routine executed by the switching unit 502 will be described below in detail. As illustrated in the flowchart in FIG. 29, the switching unit 502 determines whether the main assist controlled variable $I_{as}*$ is limited on the basis of the limit state signal $S_{grd}$ generated by the upper and lower limits guard processing unit 73 (step S901).

When it is determined that the assist controlled variable $I_{as}*$ is limited (YES in step S901), the switching unit 502 computes the increment Nu of the counter 503 corresponding to the absolute value of the deviation ΔI using the increment setting map M11 (step S902). As the absolute value of the deviation ΔI becomes larger, the computed increment Nu becomes larger.

The switching unit 502 adds the increment Nu computed in step S902 to the count value N of the counter 503 (step S903). Then, the switching unit 502 determines whether the count value N is equal to or greater than an abnormality-determining threshold Nth (step S904).

When it is determined that the count value N is equal to or greater than the abnormality-determining threshold Nth (YES in step S904), the switching unit 502 continues to assist the steering using the sub-assist controlled variable $I_{as}*$ (step S905), and then ends the processing routine. That is, the switching unit 502 supplies the sub-assist controlled variable $I_{as}*$, instead of the main assist controlled variable $I_{as}*$, to the motor control signal generating unit 62 as the final current command value I*.

When it is determined in step S904 that the count value N is neither equal to nor greater than the abnormality-determining threshold Nth (NO in step S904), the switching unit 502 continues to assist the steering using the main assist controlled variable $I_{as}*$ (more specifically, the assist controlled variable $I_{as}*$ that has been processed by the upper and lower limits guard processing unit 73) (step S906), and then ends the processing routine.

When it is determined in step S901 that the main assist controlled variable $I_{as}*$ is not limited (NO in step S901), the switching unit 502 subtracts a certain value Ns from the count value N of the counter 503 (step S907).

Then, the switching unit 502 continues to assist the steering using the main assist controlled variable $I_{as}*$ (more specifically, the assist controlled variable $I_{as}*$ that has been processed by the upper and lower limits guard processing unit 73) (step S908), and then ends the processing routine.

In this way, as the absolute value of the deviation ΔI becomes larger, the count value N is increased more promptly. That is, because the count value N is increased more promptly, the abnormality of the main assist controlled variable $I_{as}*$ is detected more promptly. Accordingly, the timing at which a prescribed failsafe operation is executed, that is, the timing at which the assist controlled variable $I_{as}*$ is switched from the main assist controlled variable $I_{as}*$ to the sub-assist controlled variable $I_{as}*$ is advanced. Therefore, it is possible to reduce the influence on the driver's steering behavior, for example, occurrence of self-steering or reverse assist.

Figure 29:
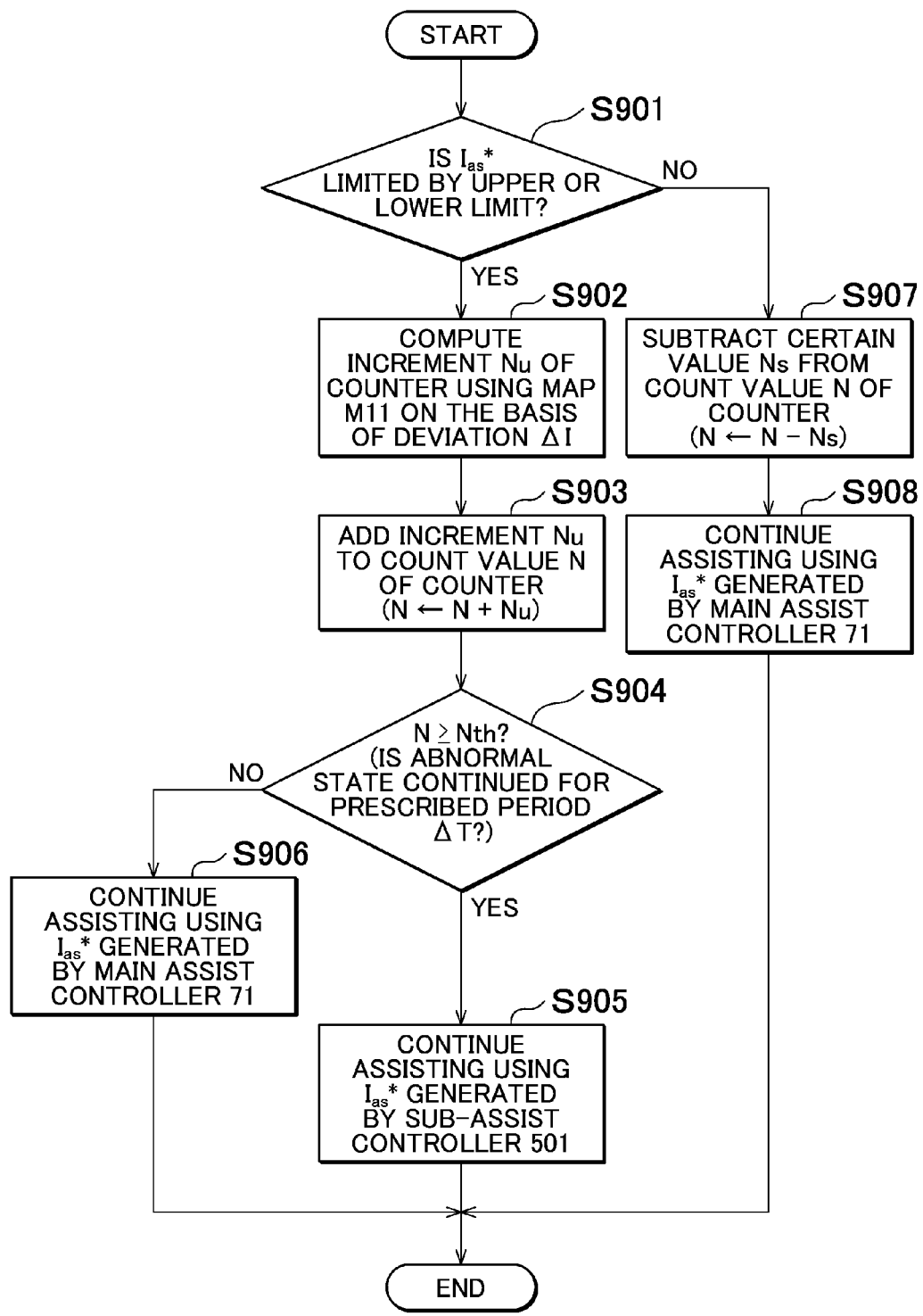
FIG. 29 is a flowchart illustrating a processing routine executed by a switching unit in the eighth embodiment.

A configuration obtained by omitting the processes in steps S907, S908 from the flowchart in FIG. 29 may be employed. In this case, the switching unit 502 ends the processing routine when it is determined that the main assist controlled variable $I_{as}*$ is not limited (NO in step S901), and then ends the processing routine.

According to the present embodiment, the following advantageous effects of 11) to 13) are obtained.

11) As the absolute value of the deviation ΔI becomes larger, the increment Nu of the counter 503 becomes larger. Accordingly, as the absolute value of the deviation ΔI becomes larger, the timing at which the prescribed failsafe operation (in this case, the operation of switching the assist controlled variable $I_{as}*$ to be used) is executed is advanced. Therefore, it is possible to reduce the influence on the driver's steering behavior, for example, occurrence of self-steering or reverse assist in the course of detecting the abnormality (during the period from when the limiting process of the assist controlled variable is started until when N≥Nth is established). It is also possible to further improve safety.

12) On the other hand, as the absolute value of the deviation ΔI becomes smaller, the increment Nu of the counter 503 becomes smaller. Accordingly, as the absolute value of the deviation ΔI becomes smaller, the timing at which the prescribed failsafe operation is executed is retarded. The reason for this is as follows. The smaller the absolute value of the deviation ΔI is, the smaller the degree of abnormality is. Accordingly, by taking into account the fact that it is necessary to more carefully detect the abnormality in such a case, it is possible to suppress erroneous detection of abnormality.

13) It is possible to execute the failsafe operation at an appropriate timing. That is, the failsafe operation is executed more rapidly when the degree of abnormality (the absolute value of the deviation ΔI) is large, whereas the failsafe operation is executed more carefully when the degree of abnormality is small.

An electric power steering system according to a ninth embodiment of the invention will be described below. In the present embodiment, basically the same configuration as that in the sixth embodiment illustrated in FIG. 22 is employed.

In the sixth embodiment, the abnormality of the assist controlled variable $I_{as}*$ is determined on the basis of the relationship between an input into the assist controller 71 and an output from the assist controller 71. Accordingly, it is not possible to identify which portion of the various control functional units of the assist controller 71 is abnormal. Because a logic of detecting an abnormal condition (condition in which an abnormality of the main assist controlled variable $I_{as}*$ has continued for the prescribed period) is employed, it is necessary to improve the steering behavior at the time of abnormality.

Therefore, in the present embodiment, on the basis of the fact that the assist control by the EPS is executed on the basis of the addition of the basic assist controlled variable based on the basic control and the compensation amount based on the compensation control, the function of determining the relationship between an input and an output is provided for each of the control functional units (computation functional units) of the assist controller 71. The steering assist is executed based on the abnormal portion of the assist controller 71. This will be specifically described below.

Figure 30:
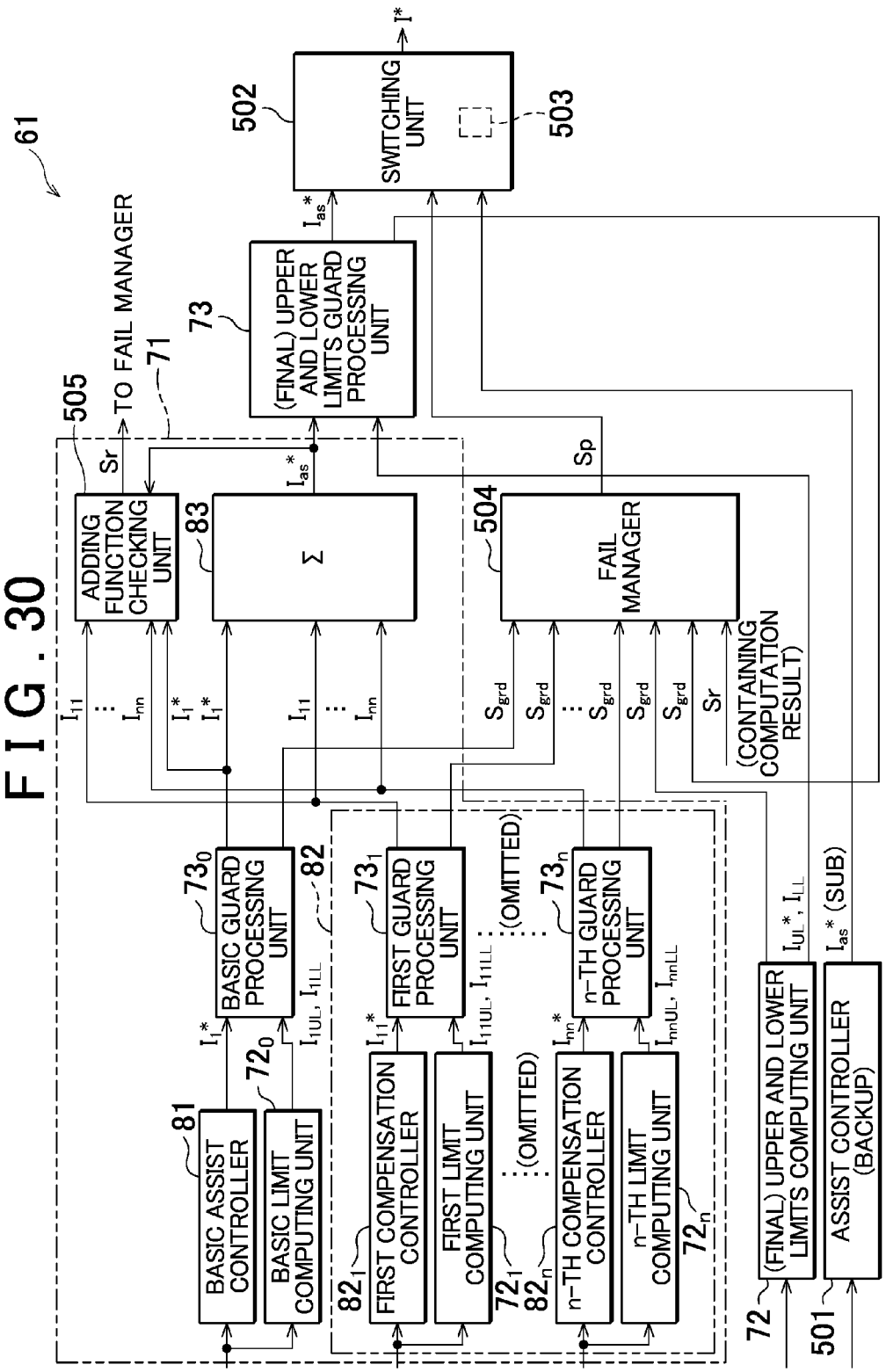
FIG. 30 is a control block diagram of a current command value computing unit in a ninth embodiment of the invention.

As illustrated in FIG. 30, the current command value computing unit 61 includes a fail manager 504 in addition to the main assist controller 71, the (final) upper and lower limits computing unit 72, the upper and lower limits guard processing unit 73, the sub-assist controller 501, and the switching unit 502.

The assist controller 71 includes a basic limit computing unit 720, a basic guard processing unit 730, and an adding function checking unit 505 in addition to the basic assist controller 81, the compensation controller 82, and the adder 83.

The basic limit computing unit 720 has a function similar to that of the upper and lower limits computing unit 72. That is, the basic limit computing unit 720 computes an upper limit $I_{1UL}*$ and a lower limit $I_{1LL}*$ as the limits of the basic assist controlled variable $I_1*$ on the basis of various signals (τ, V) used in the basic assist controller 81.

The basic guard processing unit 730 has a function similar to that of the upper and lower limits guard processing unit 73. That is, the basic guard processing unit 730 executes the limiting process on the basic assist controlled variable $I_1*$ on the basis of the limits computed by the basic limit computing unit 720. Specifically, the basic guard processing unit 730 compares the limits (the upper limit and the lower limit) with the value of the basic assist controlled variable $I_1*$. The basic guard processing unit 730 limits the basic assist controlled variable $I_1*$ to the upper limit when the value of the basic assist controlled variable $I_1*$ is larger than the upper limit, and limits the basic assist controlled variable $I_1*$ to the lower limit when the value of the basic assist controlled variable $I_1*$ is smaller than the lower limit. The basic guard processing unit 730 generates the limit state signal $S_{grd}$ indicating whether the basic assist controlled variable $I_1*$ is limited.

The compensation controller 82 includes first to n-th compensation controllers $82_1$ to $82_n$, first to n-th limit computing unit $72_1$ to $72_n$, and first to n-th guard processing units $73_1$ to $73_n$. Note that, n added as a subscript to the reference signs is a natural number and corresponds to the number of compensation controllers to be set. The details of the compensation control executed by the compensation controller 82 are set as needed depending on, for example, the product design. The first to n-th limit computing unit $72_1$ to $72_n$ each have the function similar to that of the upper and lower limits computing unit 72, and the first to n-th guard processing units $73_1$ to $73_n$ each have the function similar to that of the upper and lower limits guard processing unit 73.

The first to n-th limit computing unit $72_1$ to $72_n$ compute upper limits $I_{11UL}*$ to $I_{nnUL}*$ and lower limits $I_{11LL}*$ to $I_{nnLL}*$ as the limits of the first to n-th compensation amounts $I_{11}$ to $I_{nn}$ generated by the first to n-th compensation controllers $82_1$ to $82_n$ on the basis of various signals used in the first to n-th compensation controllers $82_1$ to $82_n$, respectively.

The first to n-th guard processing units $73_1$ to $73_n$ execute the limiting processes on the first to n-th compensation amounts $I_{11}$ to $I_{nn}$ on the basis of the limits computed by the first to n-th limit computing unit $72_1$ to $72_n$. The first to n-th guard processing units $73_1$ to $73_n$ generate limit state signals $S_{grd}$ indicating whether the first to n-th compensation amounts $I_{11}$ to $I_{nn}$ are limited, respectively.

The adder 83 generates the main assist controlled variable $I_{as}*$ by adding the first to n-th compensation amounts $I_{11}$ to $I_{nn}$ through a correcting process on the basic assist controlled variable $I_1*$. The adding function checking unit 505 executes computation similar to that executed by the adder 83, and determines whether the adder 83 is abnormal through the comparison of its own computation result with the computation result of the adder 83. The adding function checking unit 505 generates a check result signal Sr indicating whether the adder 83 is normal or abnormal. The check result signal Sr contains the computation result obtained by the adding function checking unit 505.

The upper and lower limits guard processing unit 73 executes the limiting process on the main assist controlled variable $I_{as}*$ on the basis of the limits (the upper limit $I_{UL}*$ and the lower limit $I_{LL}*$) computed by the upper and lower limits computing unit 72. The upper and lower limits guard processing unit 73 generates the limit state signal $S_{grd}$ indicating whether the main assist controlled variable $I_{as}^*$ is limited.

The fail manager 504 receives the limit state signals $S_{grd}$ generated by the basic guard processing unit 730, the first to n-th guard processing units $73_1$ to $73_n$, and the upper and lower limits guard processing unit 73. The fail manager 504 receives the check result signal Sr generated by the adding function checking unit 505. The check result signal Sr also contains the computation result obtained by the adding function checking unit 505. The fail manager 504 determines which of the main assist controlled variable $I_{as}^*$ and the sub-assist controlled variable $I_{as}^*$ should be used on the basis of the limit state signals $S_{grd}$ and the check result signal Sr, and generates a command signal Sp indicating the assist controlled variable $I_{as}^*$ (the main assist controlled variable $I_{as}^*$ or the sub-assist controlled variable $I_{as}^*$) to be used on the basis of the determination result. The fail manager 504 generates the command signal Sp indicating that the computation result obtained by the adding function checking unit 505 should be used when it is determined that the function of the adder 83 is not normal on the basis of the check result signal Sr generated by the adding function checking unit 505.

The switching unit 502 supplies the main assist controlled variable $I_{as}^*$, the sub-assist controlled variable $I_{as}^*$, or the computation result obtained by the adding function checking unit 505, as the final current command value I*, to the motor control signal generating unit 62, in response to the command signal Sp (command) generated by the fail manager 504.

Next, the processing routine executed by the fail manager 504 will be described below in detail. As illustrated in the flowchart in FIG. 31, the fail manager 504 determines whether the adding function of the adder 83 is normal on the basis of the check result signal Sr obtained by the adding function checking unit 505 (step S1001).

When it is determined that the function of the adder 83 is normal (YES in step S1001), the fail manager 504 determines whether the main assist controlled variable $I_{as}^*$ (the final output from the assist controller 71) is limited by the upper and lower limits computing unit 72 on the basis of the limit state signal $S_{grd}$ generated by the upper and lower limits guard processing unit 73 (step S1002).

When it is determined that the main assist controlled variable $I_{as}^*$ is limited by the upper and lower limits computing unit 72 (YES in step S1002), the fail manager 504 determines whether the outputs ($I_1^*$, $I_{11}$ to $I_{nn}$) from the controllers are limited on the basis of the limit state signals $S_{grd}$ generated by the processing units ($73_0$ and $73_1$ to $73_n$) (step S1003).

When it is determined that the outputs ($I_1^*$, $I_{11}$ to $I_{nn}$) from the controllers are not limited (NO in step S1003), the fail manager 504 generates a command signal Sp indicating that the sub-assist controlled variable should be used (step S1004), and then ends the processing routine.

When it is determined in step S1002 that the main assist controlled variable $I_{as}^*$ is not limited by the upper and lower limits computing unit 72 (NO in step S1002), the fail manager 504 also determines whether the outputs ($I_1^*$, $I_{11}$ to $I_{nn}$) from the controllers are limited (step S1005).

When it is determined in step S1003 or step S1005 that the outputs ($I_1^*$, $I_{11}$ to $I_{nn}$) from the controllers are limited (YES in step S1003 or YES in step S1005), the fail manager 504 executes the process in step S1006.

In step S1006, the fail manager 504 determines whether to continue to assist the steering using the main assist controlled variable $I_{as}^*$. When it is determined based on the abnormal portion that assisting of the steering should not be continued using the main assist controlled variable $I_{as}^*$ (NO in step S1006), the fail manager 504 executes the process in step S1004.

When it is determined that assisting of the steering can be continued using the main assist controlled variable $I_{as}^*$ (YES in step S1006), the fail manager 504 generates the command signal Sp indicating that the main assist controlled variable $I_{as}^*$ should be used (step S1007), and then ends the processing routine.

When it is determined in step S1005 that the outputs ($I_1^*$, $I_{11}$ to $I_{nn}$) from the controllers are not limited (NO in step S1005), the fail manager 504 ends the processing routine.

When it is determined in step S1001 that the function of the adder 83 is not normal on the basis of the check result signal Sr obtained by the adding function checking unit 505 (NO in step S1001), the fail manager 504 executes the process in step S1008.

In step S1008, the fail manager 504 generates the command signal Sp indicating that the computation result obtained by the adding function checking unit 505 should be used (step S1008), and then ends the processing routine. The command signal Sp in the present embodiment contains the computation result obtained by the adding function checking unit 505.

As described above, when the final output (the main assist controlled variable) from the main assist controller 71 is limited but the outputs ($I_1^*$, $I_{11}$ to $I_{nn}$) from the controllers are not limited, assisting of the steering is continued using the sub-assist controlled variable $I_{as}^*$, that is, the failsafe operation is executed. This is because, if which portion of the assist controller 71 is abnormal is not identified but the assist controlled variable $I_{as}^*$ that is the final output from the main assist controller 71 is limited, it is preferable that assisting of the steering be continued using the sub-assist controlled variable $I_{as}^*$.

When the final output from the assist controller 71 is limited and an abnormal portion is identified (YES in step S1003), the main assist controlled variable $I_{as}^*$ or the sub-assist controlled variable $I_{as}^*$ is used depending on the abnormal portion.

The degrees of contribution of the computation results to the assist controlled variable $I_{as}^*$ vary depending on the computation functional units of the assist controller 71 that obtain the computation results. The degrees of contribution of the computation results obtained by the computation functional units to the assist controlled variable $I_{as}^*$ vary depending on the steering system state of the moment. Accordingly, when the computation result obtained by the computation functional unit (for example, the first to n-th compensation controllers $82_1$ to $82_n$) with a small degree of contribution to the assist controlled variable $I_{as}^*$ is limited, the influence on the driver's steering behavior is also small and thus the application of the assist force based on the main assist controlled variable $I_{as}^*$ may be continuously executed without any change. In contrast, when the computation result obtained by the computation functional unit (for example, the basic assist controller 81) with a large degree of contribution to the assist controlled variable $I_{as}^*$ is limited, it is preferable that the sub-assist controlled variable $I_{as}^*$ be used, that is, the prescribed failsafe operation be executed.

The present embodiment may be modified as follows. When the final output from the assist controller 71 is not limited but the outputs ($I_1^*$, $I_{11}$ to $I_{nn}$) from the controllers are limited (YES in step S1005), assisting of the steering may be continued using the main assist controlled variable $I_{as}^*$ without any change. This is because, even when at least one of the outputs from the controllers is limited, if the final output from the assist controller 71 is in a normal range, the influence on the driver's steering behavior is considered to be small.

Figure 31:
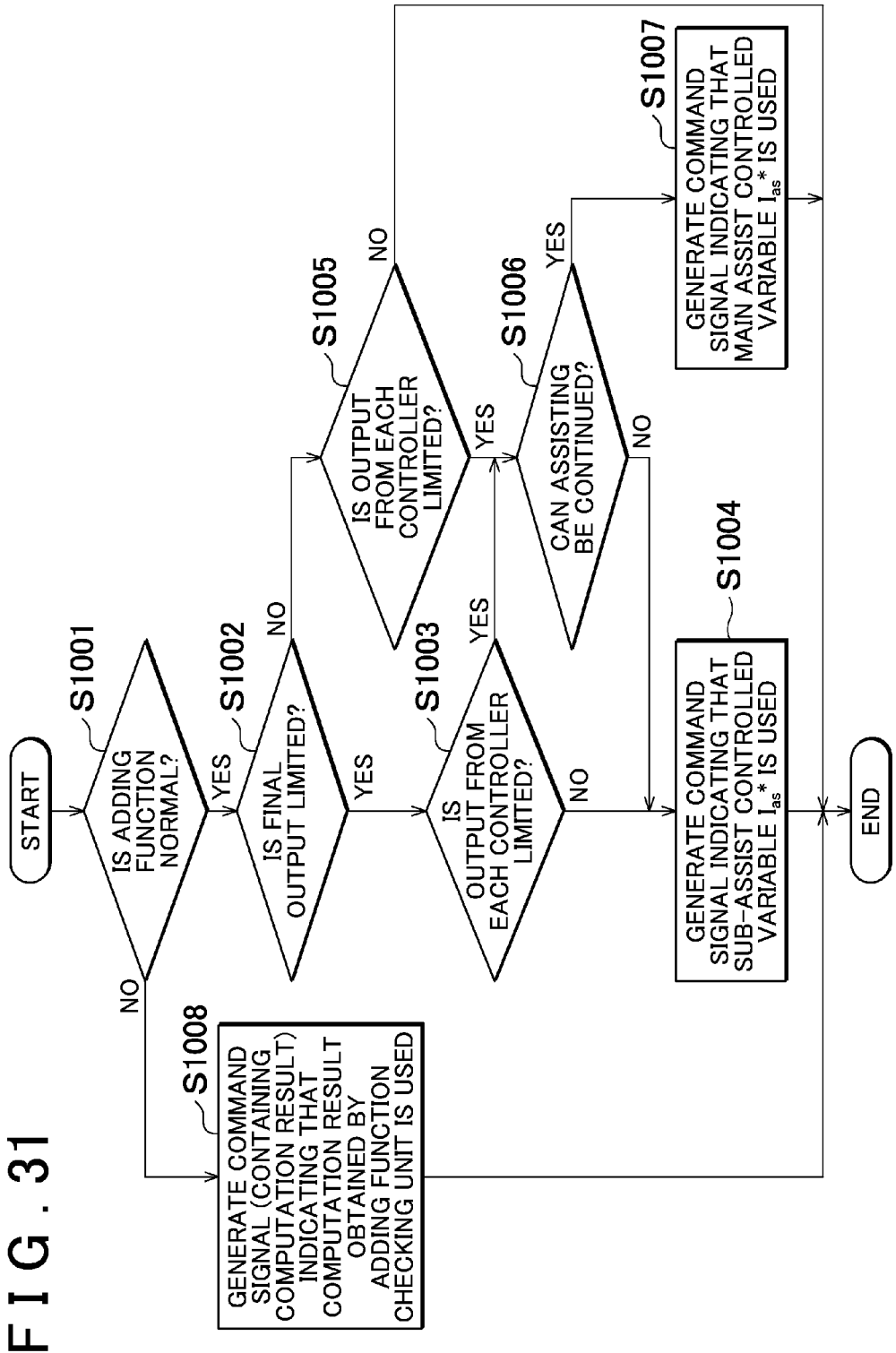
FIG. 31 is a flowchart illustrating a processing routine executed by a fail manager in the ninth embodiment.

The adding function checking unit 505 may be omitted. In this case, the processes in steps S1001 and S1008 in the flowchart in FIG. 31 are also omitted. The fail manager 504 may be omitted. In this case as well, the limiting processes are individually executed on the computation results obtained by the computation functional units of the assist controller 71. Because the computation results ($I_1^*$, $I_{11}$ to $I_{nn}$) limited by the limits are used to compute the main assist controlled variable $I_{as}^*$, it is possible to inhibit computation of the abnormal assist controlled variable $I_{as}^*$ and consequently it is possible to inhibit application of an unintended assist force. In this case, the switching unit 502 is not able to execute the failsafe operation (switching of the assist controlled variable $I_{as}^*$ to be used) based on the command from the fail manager 504, but the following measure may be taken. That is, as indicated by a two-dot chained line in FIG. 30, the counter 503 is provided to the switching unit 502 and the failsafe operation is executed on the basis of the count value of the counter 503, as in the seventh and eighth embodiments.

The sub-assist controller 501 may be omitted. In this case, the gradual decrease process illustrated in FIG. 10 may be executed on the main assist controlled variable $I_{as}^*$ as the failsafe operation (step S1004 in FIG. 31) instead of switching the assist controlled variable $I_{as}^*$ from the main assist controlled variable $I_{as}^*$ to the sub-assist controlled variable $I_{as}^*$.

Whether the computation results obtained by the signal computing units are abnormal may be determined on the basis of the relationships between the inputs into the signal computing units of the microcomputer 42 and the outputs from the signal computing units of the microcomputer 42, in addition to the relationships between the inputs into the controllers of the assist controller 71 and the outputs from the controllers of the assist controllers 71.

As illustrated in FIG. 32, for example, the signal paths to the various controllers are provided with signal computing units 506. Each signal computing unit 506 is provided with a signal limit computing unit $72_{+1}$ and a signal guard processing unit $73_{n+1}$. The signal limit computing unit $72_{n+1}$ computes the limits (the upper limit and the lower limit) for the computation result obtained by the signal computing unit 506 on the basis of the signals used in the signal computing unit 506. The signal guard processing unit $73_{n+1}$ executes the limiting process on the computation result obtained by the signal computing unit 506 on the basis of the limits computed by the signal limit computing unit $72_{n+1}$. The signal guard processing unit $73_{n+1}$ generates the limit state signal $S_{grd}$ indicating whether the computation result obtained by the signal computing unit 506 is limited. Accordingly, it is possible to subdivide the abnormality detection on the computation functional units of the microcomputer 42 in addition to the assist controller 71.

According to the present embodiment, the following advantageous effects of 13) and 14) are obtained.

13) In addition to the function of determining the abnormality of the assist controlled variable $I_{as}^*$ on the basis of the relationship between the input into the assist controller 71 and the output from the assist controller 71, functional units ($72_0$ to $72_n$ and $73_0$ to $73_n$) that determine the relationship between the input and the output for each of the controllers (81, $82_1$ to $82_n$) of the assist controller 71 are provided. Accordingly, it is possible to execute the steering assist operation based on the abnormal portion (the controller the output from which is limited) of the assist controller 71. By subdividing the detection of abnormality on the assist controller 71, it is possible to improve the accuracy of the detection of abnormality and to rapidly identify the abnormal portion. By individually limiting the outputs from the controllers of the assist controller 71, it is possible to further reduce the influence on the driver's steering behavior at the time of occurrence of an abnormality.

14) When the adding function checking unit 505 is provided, the following advantageous effect is obtained. That is, when the adding function of the adder 83 is abnormal, it is possible to continue to assist the steering using the computation result obtained by the adding function checking unit 505. Because the adding function checking unit 505 executes the operation similar to that of the adder 83, it is possible to appropriately assist the steering using the computation result obtained by the adding function checking unit 505. Because there is a possibility that an abnormality will occur in the adder 83 even if the controllers of the assist controller 71 are normal, the present embodiment is particularly useful in such a situation.

The above-described embodiments may be modified as follows. In the first to sixth embodiments, the compensation controller 82 may execute other compensation controls such as damper compensation control, in addition to the inertia control, the steering return control, and the torque derivative control. For example, the damper compensation control is control for compensating for viscosity of the steering system on the basis of the steering angular velocity ωs. At least one of the compensation controls may be executed.

What is claimed is:

1. An electric power steering system comprising:
a controller that controls a motor that is a source of an assist force to be applied to a steering system of a vehicle, wherein
the controller
computes an assist controlled variable based on multiple kinds of state quantities indicating a steering system state, and
controls the motor based on the assist controlled variable, and
the controller
individually sets, for the respective state quantities, limits that limit a variation range of the assist controlled variable based on the respective state quantities used to compute the assist controlled variable, and
limits a value of the assist controlled variable using the limits.

2. The electric power steering system according to claim 1, wherein
the controller
generates a final limit of the assist controlled variable by adding together the limits individually set for the respective state quantities, and
limits the value of the assist controlled variable using the final limit.

3. The electric power steering system according to claim 1, wherein
the controller
sets, for respective computing functional units, limits that limit variation ranges of computation results obtained by the respective computing functional units based on state quantities used in the respective computing functional units, and
limits values of the computation results using the limits.

4. The electric power steering system according to claim 3, wherein the controller determines whether application of the assist force based on the assist controlled variable is continued or a prescribed failsafe operation is executed depending on the computing functional unit of which the computation result is limited.

5. The electric power steering system according to claim 1, wherein
the controller
computes a basic component of the assist controlled variable and at least one compensation amount for the basic component, and computes the assist controlled variable by adding the basic component and the at least one compensation amount together,
computes the basic component based on at least a steering torque that is one of the multiple kinds of state quantities, and computes the compensation amount based on at least one of the multiple kinds of state quantities, and
limits the value of the assist controlled variable by setting, for the basic component, a limit that limits a variation range of the basic component based on the steering torque, and individually setting, for the at least one compensation amount, a limit that limits a variation range of the compensation amount based on the state quantity used to compute the compensation amount.

6. The electric power steering system according to claim 1, wherein:
the controller includes a counter for determining an abnormality of the assist controlled variable, and
the controller determines whether the value of the assist controlled variable is limited periodically with a prescribed period, increases a counted value of the counter each time it is determined that the value of the assist controlled variable is limited, and executes a prescribed failsafe operation when the counted value reaches an abnormality determination threshold.

7. The electric power steering system according to claim 6, wherein the controller computes a deviation between the assist controlled variable before being limited and the limit when it is determined that the value of the assist controlled variable is limited, and makes an increment of the counter larger as an absolute value of the deviation is larger.

8. The electric power steering system according to claim 1, wherein the controller forcibly decreases the final limit toward zero gradually in response to a elapse of a prescribed period after the value of the assist controlled variable is limited.

9. The electric power steering system according to claim 8, wherein the controller returns the final limit to an original value when the value of the assist controlled variable is returned to a value in the variation range.

10. The electric power steering system according to claim 1, wherein the controller stores multiple maps that define correlations between the multiple kinds of state quantities and the limits corresponding to the state quantities, and individually sets the limits for the respective state quantities based on the maps.

11. The electric power steering system according to claim 1, wherein:
the controller has a delay element that causes a phase delay of the assist controlled variable; and
the controller delays phases of the limits when there is a possibility that the assist controlled variable that need not be limited is erroneously limited due to the phase delay.

12. The electric power steering system according to claim 1, wherein the controller sets the limits corresponding to the state quantities by taking into account a vehicle speed.

13. The electric power steering system according to claim 1, wherein:
the controller includes a first assist controller and a second assist controller each of which generates the assist controlled variable; and
the controller uses a first assist controlled variable generated by the first assist controller in a normal state, and uses a second assist controlled variable generated by the second assist controller in an abnormal state in which the first assist controlled variable is limited.

* * * * *